US007665774B2

(12) United States Patent
Kumagai et al.

(10) Patent No.: US 7,665,774 B2
(45) Date of Patent: Feb. 23, 2010

(54) LOCK UNIT FOR FOLDABLE HOUSING AND ELECTRONIC APPARATUS HAVING THE SAME

(75) Inventors: Minoru Kumagai, Kawasaki (JP); Ikki Tatsukami, Kawasaki (JP); Kazuo Kobayashi, Tokyo (JP); Wataru Tanaka, Kawasaki (JP); Kaigo Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/907,614

(22) Filed: Oct. 15, 2007

(65) Prior Publication Data

US 2008/0078217 A1    Apr. 3, 2008

Related U.S. Application Data

(63) Continuation of application No. PCT/JP2006/305665, filed on Mar. 22, 2006, and a continuation of application No. PCT/JP2005/007317, filed on Apr. 15, 2005.

(51) Int. Cl.
*E05C 19/10* (2006.01)
*E05C 1/00* (2006.01)

(52) U.S. Cl. .................. 292/121; 292/106; 292/128; 292/163; 292/175; 292/302; 292/DIG. 37; 70/159; 361/683

(58) Field of Classification Search ............ 292/99, 292/102, 106, 121, 127, 128, 137, 145, 146, 292/150, 163, 175, 302, DIG. 37, DIG. 48, 292/DIG. 50; 361/383; 70/159
See application file for complete search history.

(56) References Cited

U.S. PATENT DOCUMENTS 1,257,998 A * 3/1918 Gruber .................. 292/170

(Continued)

FOREIGN PATENT DOCUMENTS

JP    7-16221    3/1995

(Continued)

OTHER PUBLICATIONS

PCT Published Application No. WO 2006/112022, Published Oct. 26, 2006(International Application No. PCT/JP2005/007317), Abstract.

(Continued)

*Primary Examiner*—Carlos Lugo
(74) *Attorney, Agent, or Firm*—Staas & Halsey LLP

(57) ABSTRACT

A lock unit used for an electronic apparatus that includes a foldable and unfoldable housing that has a first surface that is foldable, and a second surface orthogonal to the first surface includes a lock member that locks the housing in a folded state, an operation member that moves the lock member and releases a lock of the housing by the lock member, and a transmission mechanism that transmits a driving force applied to the operation member to the lock member by changing an operating direction of the operation member to another direction, and moves the lock member in the other direction, wherein the operation member is provided on the second surface, and an operating direction of the operation member is a first direction perpendicular to the second surface, the lock member projecting in a second direction orthogonal to the first surface, and a moving direction of the lock member being a third direction orthogonal to the first and second directions.

7 Claims, 21 Drawing Sheets

U.S. PATENT DOCUMENTS

| | | | | |
|---|---|---|---|---|
| 1,287,973 | A * | 12/1918 | Gruber | 292/170 |
| 2,036,154 | A * | 3/1936 | Littledale | 292/170 |
| 2,478,434 | A * | 8/1949 | Swanson | 292/31 |
| 2,726,889 | A * | 12/1955 | Lawson | 292/170 |
| 2,905,493 | A * | 9/1959 | Tocchetto | 292/37 |
| 3,090,643 | A * | 5/1963 | Barnes, Sr. | 292/170 |
| 4,740,020 | A * | 4/1988 | Williams | 292/41 |
| 5,511,833 | A * | 4/1996 | Tashman et al. | 292/145 |
| 5,626,374 | A * | 5/1997 | Kim | 292/170 |
| 6,707,665 | B2 * | 3/2004 | Hsu et al. | 361/681 |
| 7,088,588 | B2 * | 8/2006 | Lee | 361/725 |
| 7,154,745 | B1 * | 12/2006 | Wu | 361/681 |
| 7,410,194 | B2 * | 8/2008 | Chen et al. | 292/37 |
| 7,417,851 | B2 * | 8/2008 | Chen et al. | 361/681 |

FOREIGN PATENT DOCUMENTS

| | | |
|---|---|---|
| JP | 11-237930 | 8/1999 |
| JP | 2002-73205 | 3/2002 |

OTHER PUBLICATIONS

PCT Published Application No. WO 2006/112232, Published Oct. 26, 2006(International Application No. PCT/JP2006/305665), Abstract.

Chinese Office Action for corresponding Chinese Patent Application No. 2006800088694 dated Jun. 5, 2009 (in English).

* cited by examiner

LOCK UNIT FOR FOLDABLE HOUSING AND ELECTRONIC APPARATUS HAVING THE SAME

This application is a continuation based on International Patent Applications Nos. PCT/JP2005/007317, filed on Apr. 15, 2005, and PCT/JP2006/305665, filed on Mar. 22, 2006, each of which is hereby incorporated by reference herein in its entirety as if fully set forth herein.

BACKGROUND OF THE INVENTION

The present invention relates generally to an electronic apparatus, and more particularly to a lock/unlock unit of a foldable housing of the electronic apparatus. The "electronic apparatus," as used herein, intends to cover, for example, a laptop personal computer ("PC"), a personal digital assistant ("PDA"), an electronic dictionary, electronic stationery, and a game machine. The present invention is suitable, for example, for a lock/unlock unit (simply referred to as a "lock unit" hereinafter") used for the laptop PC.

Due to the recent spreads of PCs, laptop PCs are increasingly required to be easier to use. The typical laptop PC's housing includes a display unit (upper housing) equipped with a liquid crystal display ("LCD") screen, and a body (lower housing) over which the display unit is foldable and from which the display unit is unfoldable. The display unit typically has a hook and an operation member, and the body has an engagement hole. In folding the housing, the display unit is rotated toward the body, and the housing is locked in the folded state when the hook is engaged with the body through the engagement hole. In unfolding the housing, the operation member is operated to move the hook and to release the lock, and then the display unit is rotated in a direction separating from the body. Due to the recent widespread uses of PCs to watch TV broadcasting and DVD movies, many users enjoy images on a high-quality, wide display screen, a smaller lock unit to secure the LCD screen space has been increasingly demanded.

FIG. 21 shows the conventional lock unit 10 in a lock state. The lock unit 10 includes an operation button 12 provided on a display unit 11, a hook 13 coupled with the operation button 12, a forcing member 14, such as a compression spring, provided in the display unit 11, and an engagement hole 16 provided in the body 15. The forcing member 14 forces the operation button 12 and the hook 13 in the A direction. Therefore, the hook 13 is engaged with the body 15 once inserted into the engagement hole 16. As a result, the display unit 11 is locked up on the body 15. In this state, when the operation button 12 is pressed, the operation button 12 moves with the hook 13 in the B direction and the hook 13 is disengaged from the body 15. As a result, the display unit 11 is unlocked and becomes unfoldable. Thereafter, a user opens the display unit 11 by at least a predetermined angle while pressing the operation button 12. As a result, the hook 13 is spaced from the engagement hole 16. Once the hook 13 escapes from the engagement hole 16, the user continues to push the operation button 12 upwardly or holds the top of the display unit 11 to rotate it upwardly, unfolding the display unit 11 from the body 15.

FIG. 22 shows another example of the conventional lock unit 20. The lock unit 20 includes an operation button 22 provided on a display unit 21, a hook 23 fixed onto the operation button 22, a forcing member 24, such as a compression spring, provided on the display unit 21, and an engagement hole 26 provided in the body 25. The forcing member 24 forces the operation button 22 and the hook 23 in a C direction. Therefore, the hook 23 is engaged with the body 25 once inserted into the engagement hole 26. As a result, the display unit 21 is locked onto the body 25. In this state, when the operation button 22 with the hook 23 is slid in a D direction, the hook 23 is disengaged from the body 25 and the display unit 21 is unlocked and becomes unfoldable. Thereafter, a user opens the display unit 21 by at least a predetermined angle while pressing the operation button 22. As a result, the hook 23 is spaced from the engagement hole 26. Once the hook 23 escapes from the engagement hole 26, the user continues to push the operation button 22 upwardly or holds the top of the display unit 21 to rotate it upwardly, unfolding the display unit 21 from the body 25.

The conventional lock units 10 and 20 for the laptop PC are not so easy to use. Firstly, the lock unit 10 requires a width of each of the display unit 11 and the body 15 to secure a moving range of the hook 13 or the length of the engagement hole 16, and prevents an effective utilization of the housing space. As a result, demands for a miniaturization of the entire apparatus and a wide screen display unit cannot be met unfavorably. The lock unit 20 solves this problem but the unfolding direction of the display unit 21 is perpendicular to the D direction in which the operation button 22 is moved. Therefore, in unfolding the folded housing, the user needs to execute two actions, such as a movement of the operation button 22 in the lateral direction, and then an upward rotation of the display unit, deteriorating the operability.

BRIEF SUMMARY OF THE INVENTION

Accordingly, it is an illustrative object of the present invention to provide a lock unit and an electronic apparatus having the same, which can effectively utilize the housing space and improve the operability.

A lock unit according to one aspect of the present invention used for an electronic apparatus that includes a foldable and unfoldable housing, the housing having a first surface that is foldable, and a second surface orthogonal to the first surface includes a lock member that locks the housing in a folded state; an operation member that moves the lock member and releases a lock of the housing by the lock member, and a transmission mechanism that transmits a driving force applied to the operation member to the lock member by changing an operating direction of the operation member to another direction, and moves the lock member in the other direction, wherein the operation member is provided on the second surface, and an operating direction of the operation member is a first direction perpendicular to the second surface, the lock member projecting in a second direction orthogonal to the first surface, and a moving direction of the lock member being a third direction orthogonal to the first and second directions.

In the conventional lock unit 10, the moving direction of the operation button 12 is the same as that of the hook 13. In the conventional lock unit 20, the moving direction of the operation button 22 is the same as that of the hook 23. Therefore, either the effective utilization of the housing space and or operability in the opening and closing actions is sacrificed. On the other hand, the lock unit of the present invention solves this problem because the operating direction of the operation member is different from the moving direction of the lock member due to the transmission mechanism. In one embodiment, the operating direction of the operation member is orthogonal to the moving direction of the lock member, whereas the present invention intends to cover one of them inclines to the other, and one of them is a line and the other is a rotation. In unfolding the housing, both an action to move forward the operation member, and an action to subsequently lift the housing are necessary. However, these actions do not significantly change the hand position, and the user feels as if one action can unfold the housing. Therefore, the manipulation of the operation member and unfolding of the housing can be performed continuously, and the operability improves. On the other hand, in the conventional lock unit, the lateral movement of the operation button 22 is greatly different from the lifting action of the housing. Therefore, the user feels as if two actions unfold the housing, and the operability is bad.

The housing may include a first housing unit that moves in folding and unfolding time, and a second housing unit that is coupled with the first housing unit, the operation member and the lock member being provided in the first housing unit. The present invention is suitable to a structure that smoothens unlocking and unfolding of the housing when the operation member and the lock member are provided onto the first housing unit that moves relative to the second housing unit. The transmission mechanism may include a projection fixed onto one of the lock member and the operation member, and a guide member that is provided on the other of the lock member and the operation member, and guides a movement of the projection, a guidance direction of the guide member inclining to a moving direction of the lock member. The guide member may have a guide groove that extends in a direction of 45° to the moving direction of the lock member. Alternatively, transmission mechanism may include a first bevel plane provided on the operation member, and a second bevel plane that is provided on the lock member, and can operably contact the first bevel plane. In this case, one of the first and second bevel planes may have a projection, and the first and second bevel planes may contact each other via the projection. Each of the first and second bevel planes may extend in a direction of 45° to the moving direction of the lock member.

The lock unit may further include a guide member that guides a movement of the operation member or the lock member. Thereby, the unstableness can be prevented when the operation member and the lock member move.

The lock unit may further include a first guide member that guides a movement of the operation member, and has a first guide groove that extends in the operating direction of the operation member and a restricting member that is fixed onto the housing and inserted into the first guide groove, and a second guide member that guides a movement of the lock member, and has a second guide groove that extends in the moving direction of the lock member and the restricting member that is fixed into the housing and inserted into the second guide groove. The restricting member, such as a rod, is commonly used for both first and second guide members, reducing the number of components, and preventing the unstableness.

The lock unit may further include a first engagement member that extends in a direction approximately perpendicular to the moving direction of the lock member, and is coupled with the lock member, a second engagement member that extends in the direction approximately perpendicular to the moving direction of the lock member, and is fixed onto the housing, a rod that having one end that is fixed onto the first engagement part, and the other end that penetrates through the second engagement part, the rod extending in the moving direction of the lock member, and a forcing mechanism, such as a compression spring, that is provided around the rod, and has one end that contacts the first engagement part, and the other end that contacts the second engagement part. The rod serves to hold the forcing member and to guide a movement of the lock member, effectively utilizing the housing space.

The lock member may be movable between a lock position used to lock the housing and an unlock position used to unlock the housing, wherein the operation member is movable between a non-operating position that allows the lock by the lock member and an operating position that releases the lock by the lock member, and wherein the lock unit further comprising a forcing member that forces the lock member towards the lock position, and the operation member towards the non-operating position. One forcing mechanism serves two forcing functions, and contributes to effectively utilize the housing space.

An electronic apparatus, such as a laptop PC, having the above lock unit also constitutes one aspect of the present invention.

Other objects and further features of the present invention will become readily apparent from the following description of preferred embodiments with reference to the accompanying drawings.

DETAILED DESCRIPTION OF THE PREFERRED EMBODIMENTS

Figure 1:
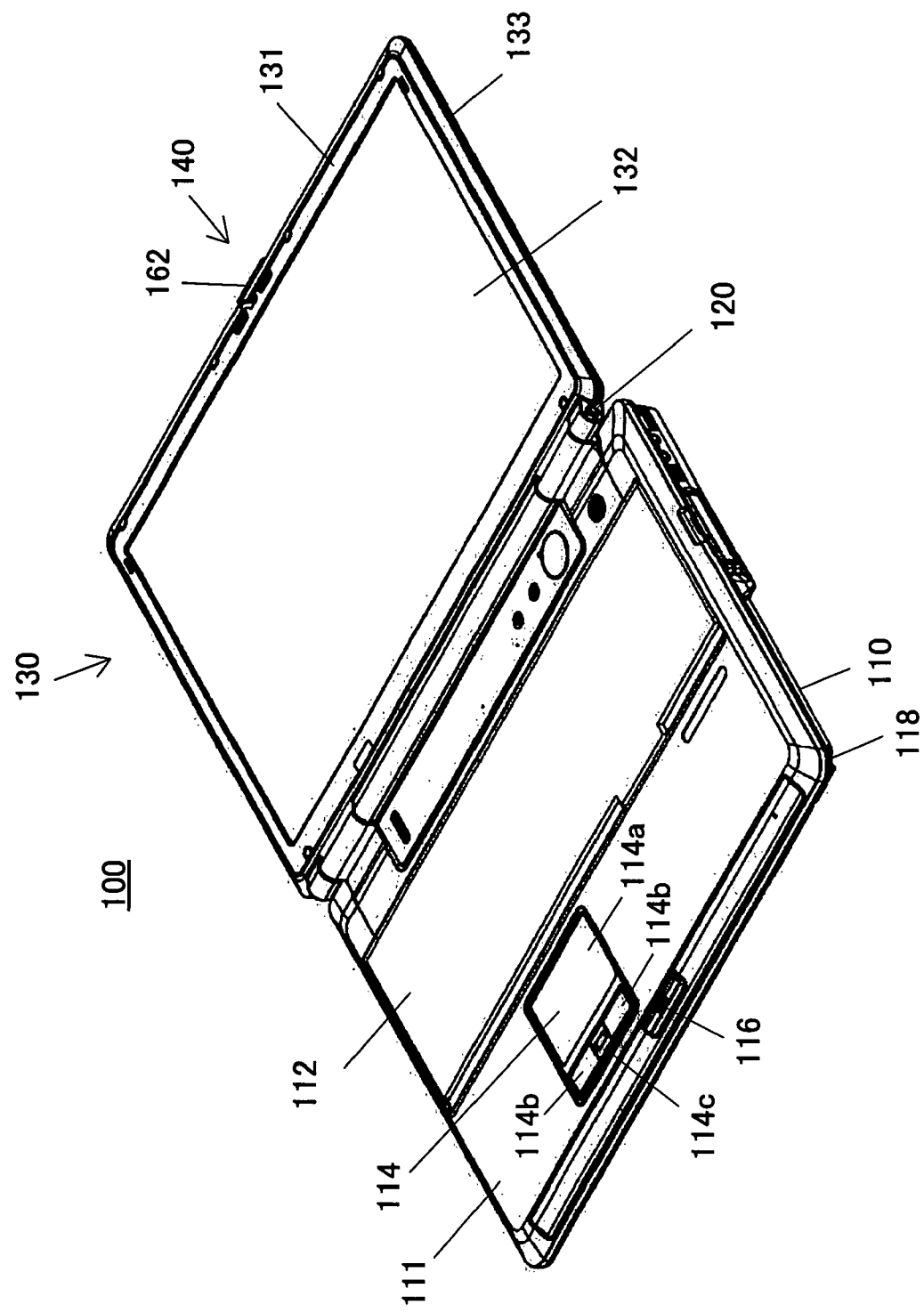
FIG. 1 is a perspective overview of an electronic apparatus (laptop PC) in an unfolded state according to a first embodiment of the present invention.
Figure 2:
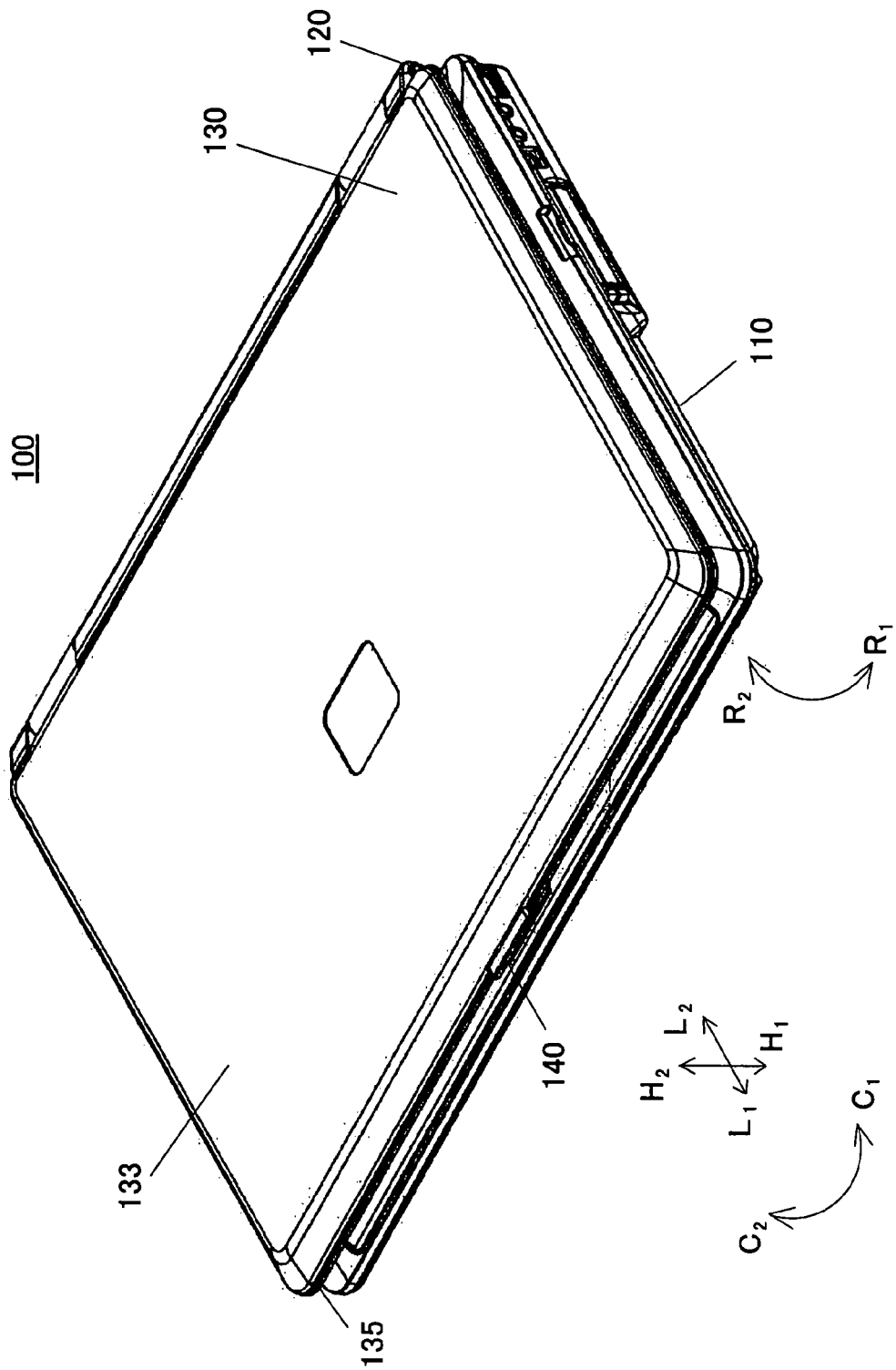
FIG. 2 is a perspective overview of the electronic apparatus in a folded state shown in FIG. 1.

Referring now to the accompanying drawings, a description will be given of an electronic apparatus 100 according to a first embodiment of the present invention, which is implemented as a laptop PC. Here, FIG. 1 is a perspective overview of the laptop PC 100 in the unfolded state. FIG. 2 is a perspective overview of the laptop PC 100 in the folded state. Referring to FIG. 1, the electronic apparatus 100 is illustratively implemented as, but not limited to, the laptop PC 100. The electronic apparatus 100 may be another portable electronic apparatus, such as a PDA, hand-held PC, a palm-sized PC, a wearable PC, an electronic dictionary, electronic stationery, a gaming machine, and a portable household appliance (e.g., a portable TV, a portable VCR, and a portable DVD). The size of the laptop PC 100 intends to cover an A4 size, a B5 size, another sub-notebook size, and a mini-notebook size.

The laptop PC includes a PC body 110, a hinge 120, a display unit (LCD bezel frame) 130, and a lock unit 140. The body 110 and the display unit 130 constitute a housing of the laptop PC 100.

The body 110 has a housing structure, for example, with a thickness between about 20 mm and about 30 mm. The body 110 includes an upper cover 111, a middle cover (not shown), and a lower cover 118. Each of the upper cover 111, a middle cover, and a lower cover 118 is made of resin molding. The body 110 accommodates a circuit board and an HDD, and the upper cover 111 has a keyboard 112 for information typing, a pointing device 114, and an engagement hole 116.

The upper cover 111 is a palm rest on which palms or wrists are placed, and is located in front of the keyboard 112. A surface of the upper cover 111 is a surface to be folded in the laptop PC 100. As described later, a back surface of the upper cover 111 is engaged with a hook 174.

A type of the keyboard 112 is not limited, such as 101, 106, 109, ergonomic, and the keyboard arrangement is not also limited, such as QWERT, DVORAK, JIS, new-JIS, and NICOLA (NIhongo Nyuryoku COnthotium LAyout).

The pointing device 14 emulates part of a mouse function, and has a touch-pad 114a, a pair of click buttons 114b, and a roll-type scroll wheel 114c. The touch pad 114a realizes the mouse function on the LCD screen 132 when the user moves his index finger on the touch pad 114a. The pair of click buttons 114b serve as mouse's left and right click buttons. Since the roll-type scroll wheel 114c is located between the left and right click buttons 114b and serves as a mouse's scroll wheel, the operability of the device 114 improves.

The engagement hole 116 is a hole into which the hook 174 is inserted, as described later.

The hinge part 120 has a hinge cover and a shaft. The hinge part 120 connects the display unit 130 with the body 110 so that the display unit 130 can rotate around the body 110. The hinge cover is mounted with a power button, but this arrangement is merely illustrative.

Figure 4:
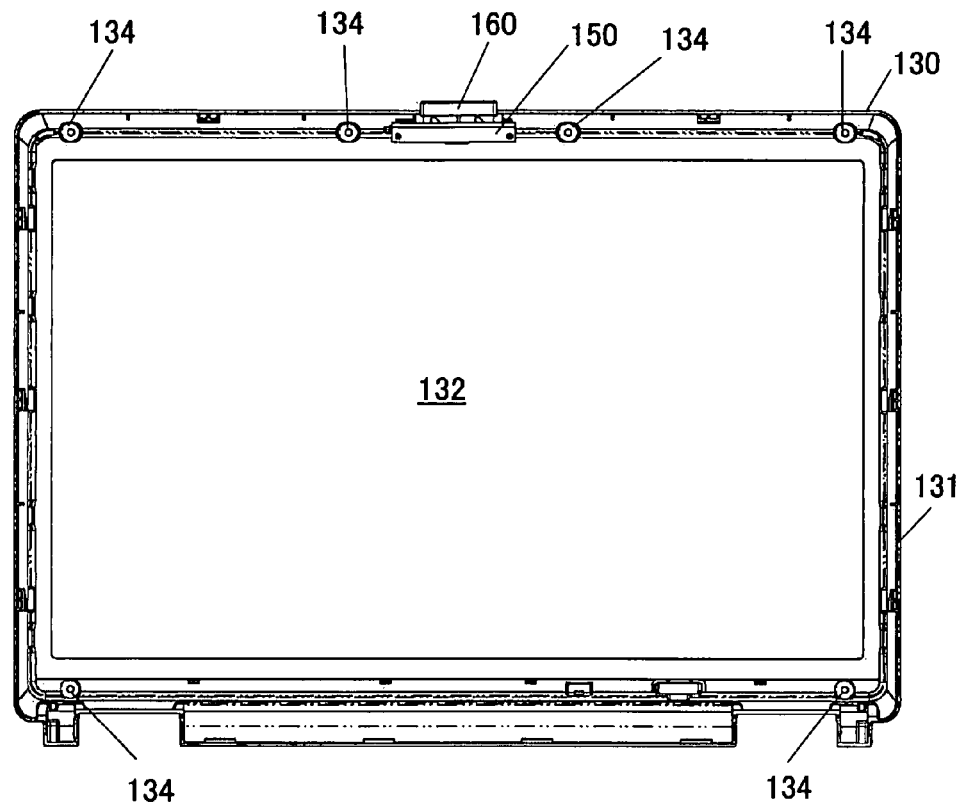
FIG. 4 is a plane view of the electronic apparatus shown in FIG. 1 in which a rear cover is detached from a display unit.
Figure 5:
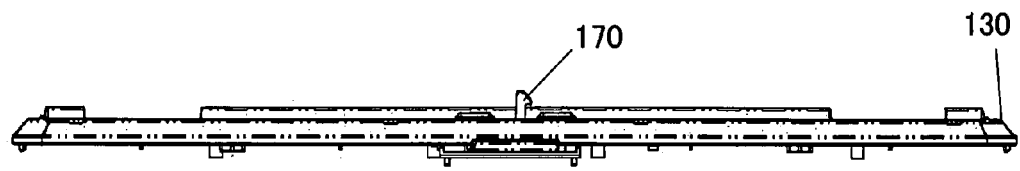
FIG. 5 is a top view of the electronic apparatus shown in FIG. 4.

The display unit 130 includes a front cover 131, an LCD screen 132, and a back cover 133. The front cover 131 and the back cover 133 are fixed and coupled with each other via plural screw holes 134 shown in FIG. 4, and the LCD screen 132 is arranged between them. FIG. 4 is a plane view of the display unit 130 with the rear cover detached. FIG. 5 is a top view of the display unit 130 shown in FIG. 4.

The front cover 131 is a hollow rectangular frame made of resin molding, and is connected to a hinge cover on the center bottom. The back cover 133 has a substantially rectangular shape when viewed from its front, and has a sectionally U-shape in which both sides rise. The back cover 133 is connected to the hinge cover at its center bottom, and made of resin molding.

Figure 3:
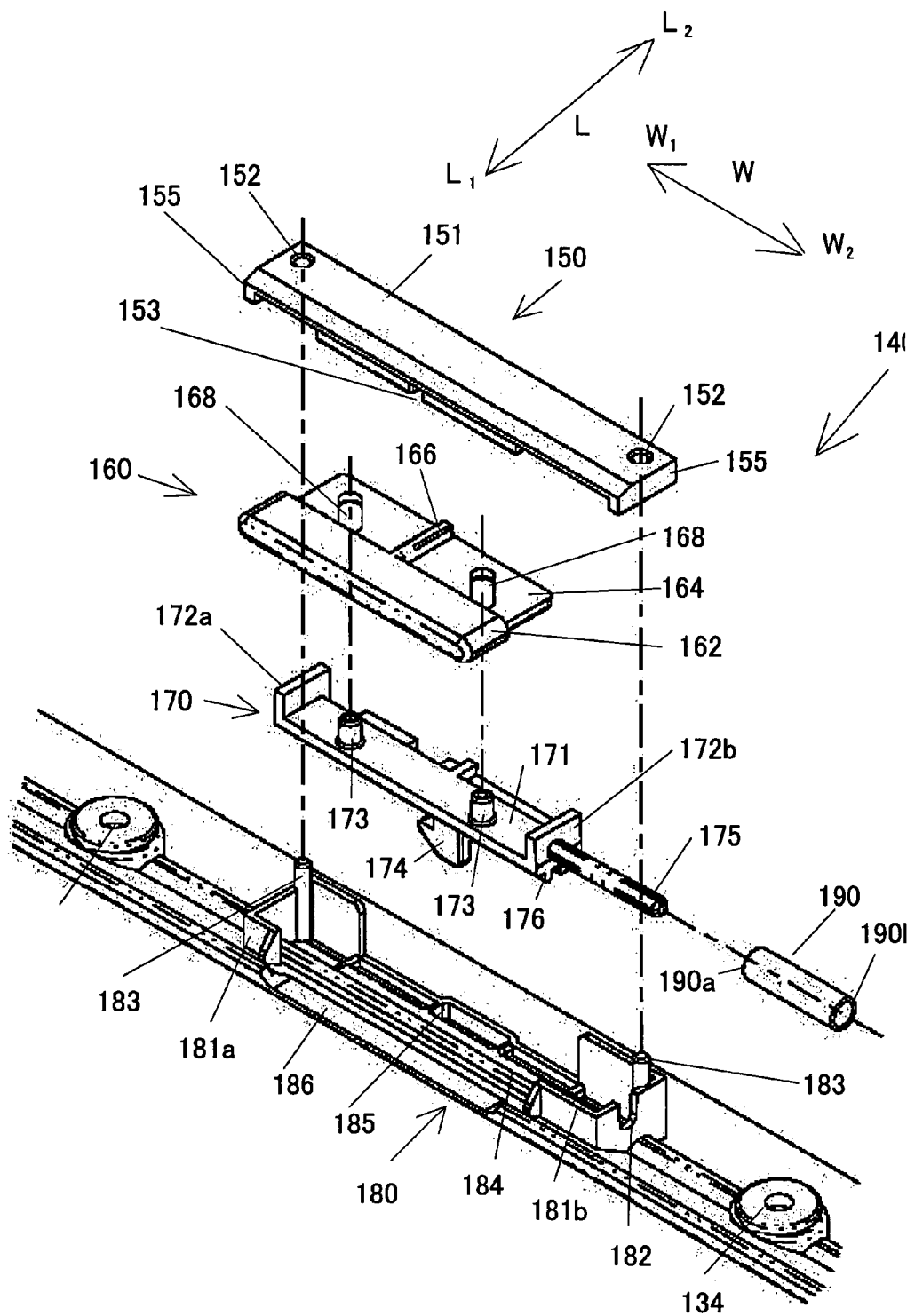
FIG. 3 is an exploded perspective view of a lock unit according to the first embodiment applicable to the electronic apparatus shown in FIG. 1.

The lock unit 140 locks and unlocks the display unit 130 that has been folded over the body 110. The lock unit 140 includes, as shown in FIG. 3, a top plate 150, an operation member 160, a lock member 170, a base 180, and a forcing member 190. FIG. 3 is an exploded perspective view of the lock unit 140. Illustratively, the lock unit 140 of this embodiment is arranged on the center top of the display unit 130.

The top plate 150 seals the lock unit 140, and guides a movement of an operation button 162 of the operation member 160. The top plate 150 includes a base 151, a pair of attachment holes 152, and a guide groove 153 and is made, for example, of ABS resin.

The base 151 is a plate lid member, and seals the lock unit 140 in cooperation with the base 180. The base 151 has a pair of perforating attachment holes 152 at both ends, and has the guide groove 153 in its back surface. A pair of rods 183 of the base 180 is inserted into a pair of attachment holes 152. As a result, the top plate 150 is fixed onto the base 180. The guide groove 153 extends in an L direction perpendicular to a front surface 135 of the display unit 130 shown in FIG. 2. The guide groove 153 is engaged with a projection part 166 of the operation member 160. Alternatively, the base 151 may have a projection part and the operation member 160 may have a guide groove. The number of the guide grooves and the number of projection parts are not limited. An arrangement of each of the guide groove and the projection part is not also limited. For example, a pair of projection may be provided at both side surfaces of a guide part 164 of the operation member 160, and a pair of grooves may be provided that extend in the L direction in the pair of sidewalls 155 that bend from both ends of the top plate 150 downwardly. A guidance operation between the guide groove 153 and the projection part 166 prevents unsteadiness when the operation member 160 is moving.

The operation member 160 moves the lock part 170, and serves to unlock the folded housing that has been locked by the lock part 170. The operation member 160 can move in the L direction. The operation member 160 includes an operation button 162, a guide member 164, the projection part 166, and a pair of guide grooves 168 and is made, for example, of ABS resin.

Figure 8:
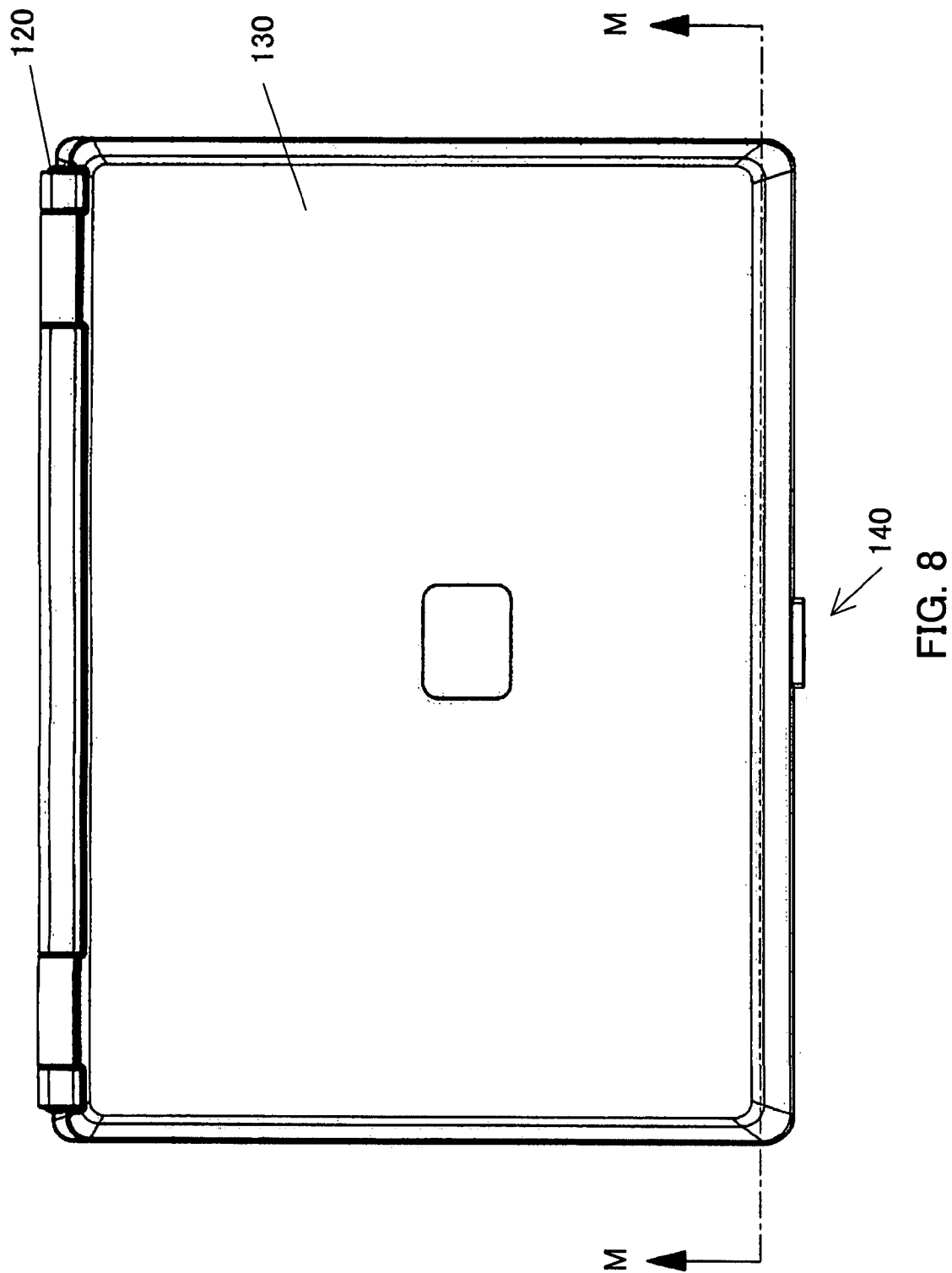
FIG. 8 is a plane view of the electronic apparatus shown in FIG. 2 in the lock state.

The operation button 162 serves as a release button onto which a compressive force is applied by a user in the unlock time. The operation button 162 projects to the front from the front surface 135 of the display unit 130, as shown in FIGS. 2, 4, and 8. In addition, the operation button 162 of this embodiment is illustratively flat.

The guide member 164 is integrated with the operation button 162, and exhibits two guiding functions. The first guiding function is a guidance of a movement of the operation member 160 in the L direction in cooperation with the top plate 150. In order to exhibit this function, the guide member 164 has the projection part 166 at its center, which extends in the L direction. The second guiding function is a moving function of the hook 174 of the lock member 170 in a $W_2$ direction by converting a direction of the driving force applied to the operation button 162 in the $L_2$ direction into the $W_2$ direction in cooperation with a pair of projections 173 of the lock member 170, and transmitting the converted driving force to the hook 174. For this function, the guide member 164 has a pair of guide grooves 168 engaged with a pair of projections 173. Each guide groove 168 is configured to have the same angle θ of 45° to the W direction. As the angle θ increases, the operation button 162 is likely to move but the moving amount of the hook 174 becomes small. In order to secure the same moving amount, the moving amount of the operation button 162 in the $L_2$ direction becomes large. As the angle θ decreases, the moving amount of the hook 174 becomes large and a smaller moving amount of the operation button 162 in the $L_2$ direction is enough for the same moving amount. However, the operation button 162 becomes hard to move. Setting the angle θ to 45° can properly maintain the movement easiness and moving amount of the operation button 162, and the moving amount of the hook 174.

While this embodiment provides the guide groove 168 in the guide member 164 and the projection 173 on the lock member 170, the guide member 164 may have a projection part and the lock member may have a guide groove.

According to this embodiment, the guide member 164 converts a direction of the driving force applied to the operation button 162 in the $L_2$ direction and transmits the converted driving force to the hook 174 of the lock member 170, but this embodiment does not limit the driving-force direction or a conversion direction. When the driving-force direction is the $L_2$ direction, a hand position seldom changes when the driving force transfers to the rotating direction ($R_2$ direction) to open the display unit 130 in FIG. 2. Therefore, the user feels as if one action can unfold the housing. A $H_2$ or $C_1$ direction is, for example, a conceivable driving-force direction which achieves the opening action of the display unit 130 without greatly changing the user's hand position. In other words, in FIG. 2, the present invention is applicable when the operation button 162 is displaced in the upper direction ($H_2$ direction) or rotated counterclockwise ($C_1$ direction), and then the display unit 130 is opened in the $R_2$ direction. A moving direction of the hook 174 is not limited as long as the hook 174 is disengaged from the upper cover 111. Therefore, for example, the hook 174 may rotate around the projection part 166 in FIG. 3.

The lock member 170 serves to lock the housing in the folded state, and can move the housing in the W direction. The lock member 170 includes a base 171, a pair of sidewalls 172a and 172b, the pair of projections 173, a hook 174, a shaft 175, and a guide groove 176 and is made, for example, of polyacetal.

The base 171 is a plate member that is movable in the W direction. A pair of sidewalls 172a and 172b extends upwardly from both ends of the base 171, and the forcing member 190 forces the sidewall 172b. As a result, the hook 174 is forced in the $W_1$ direction.

A pair of projections 173 are provided on the surface of the base 171, and engaged with the pair of guide grooves 168. As discussed above, the projections 173 constitute part of the transmission mechanism that changes the direction of the driving force applied to the operation button 162.

Figure 6:
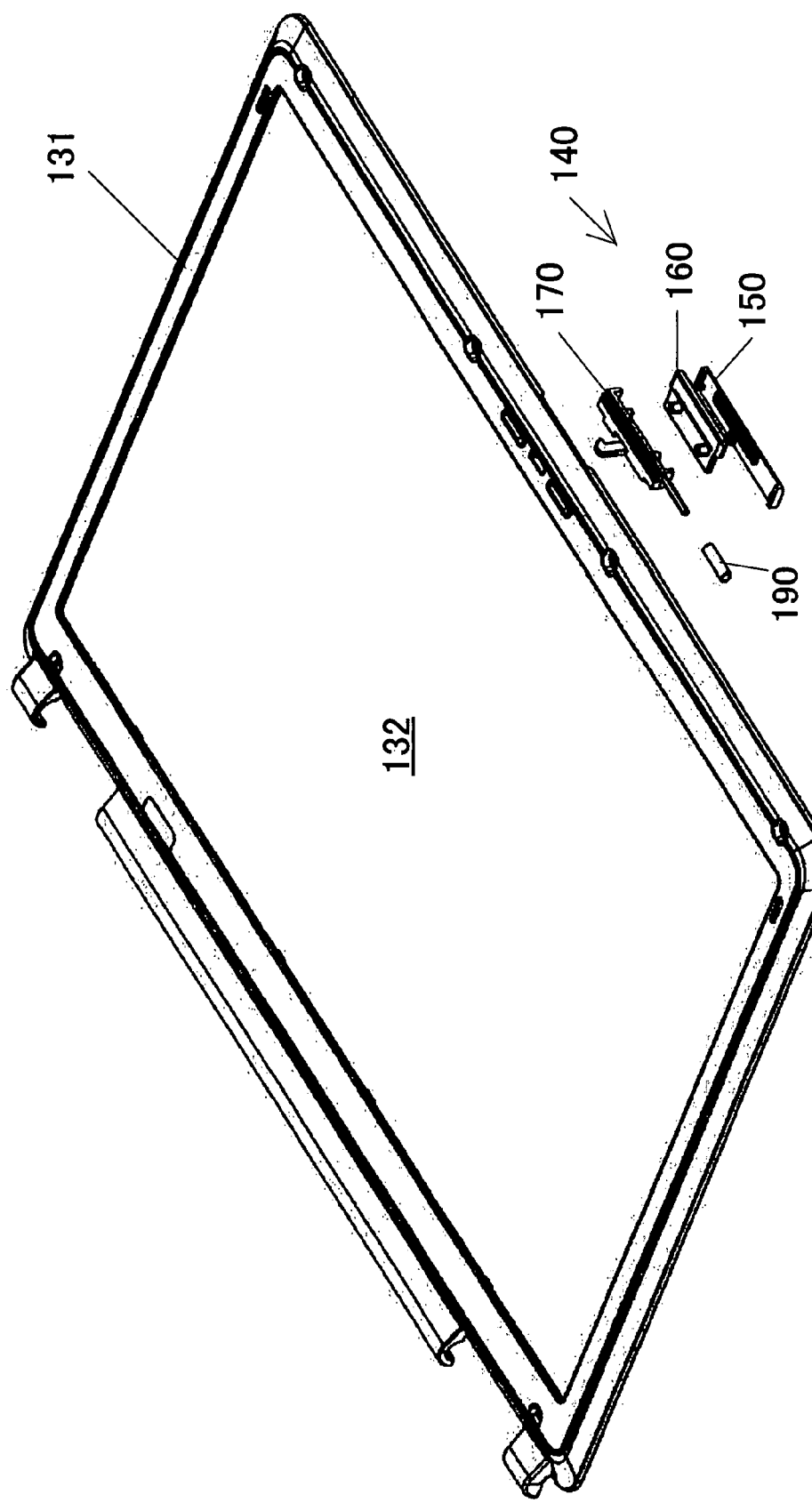
FIG. 6 is an exploded perspective view of the lock unit and part of the display unit in the electronic apparatus shown in FIG. 1.
Figure 7:
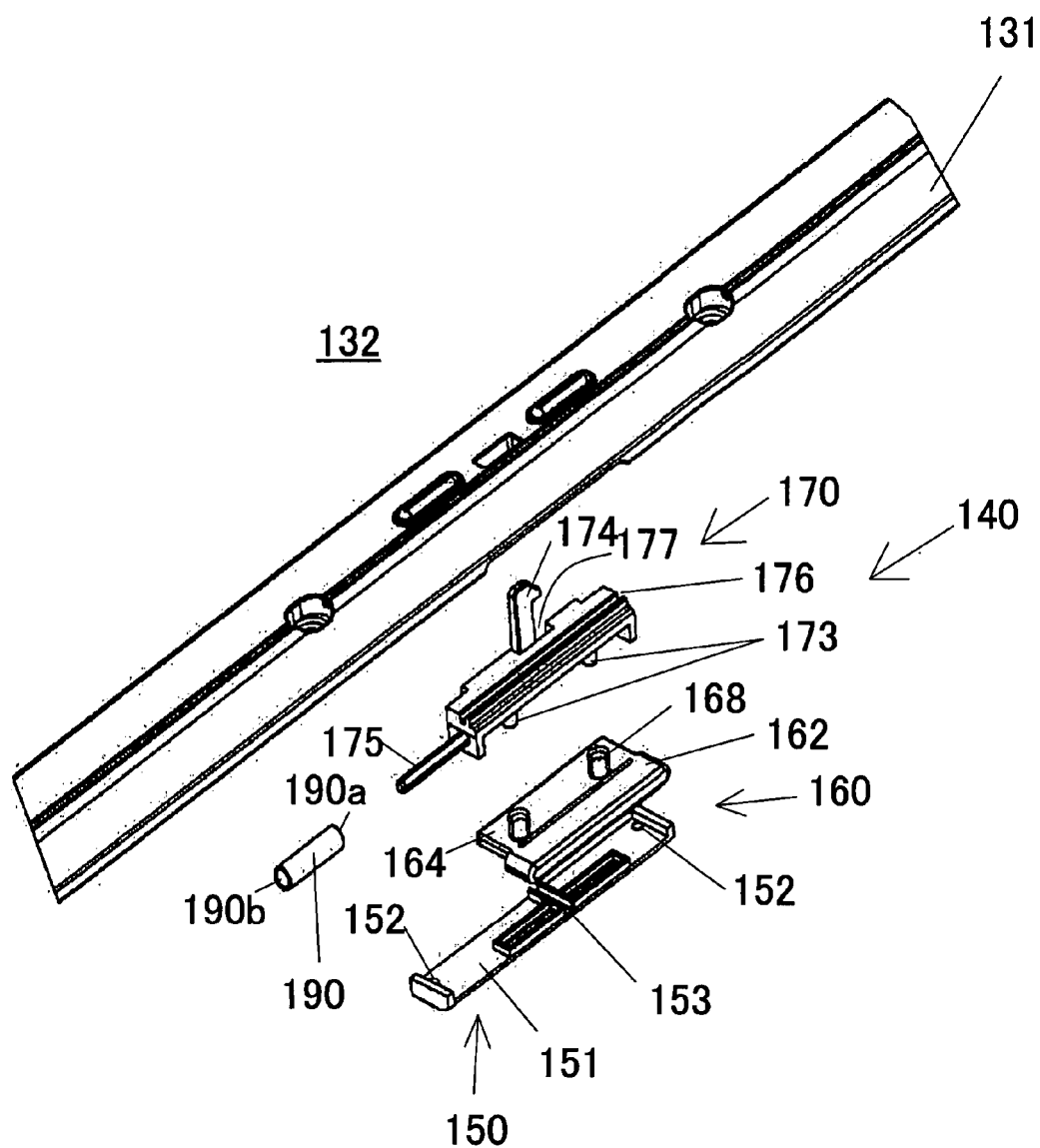
FIG. 7 is an enlarged exploded perspective view of the lock unit shown in FIG. 6.

The hook 174 is a hook member that is engageable with the back surface of the upper cover 111 and serves to lock the housing in the folded state. The hook 174 projects from the back surface of the base 171, and is movable with the base 171 in the W direction. The hook 174 is inserted into a perforation hole 185, and its movement in the W direction is restricted. The end of the perforation hole 185 in the $W_1$ direction is a lock position at which the hook 174 is engaged with the back surface of the upper cover 111, and the end of the perforation hole 185 in the $W_2$ direction is an unlock position at which the hook 174 is disengaged from the back surface of the upper cover 111. The base 171 has a notch 177 as shown in FIG. 7, and the hook 174 is housed in the notch 177. FIG. 7 is an enlarged exploded perspective view of FIG. 6, and FIG. 6 is an exploded perspective view of the lock unit 140 and part of the display unit 130.

The shaft 175 supports the compression spring 190 that serves as a forcing member, and serves to guide a movement of the lock member 170 in the W direction. The shaft 175 serves to hold the forcing member and to guide a movement of the lock member 170, effectively utilizing the housing space. The shaft 175 is a rod, one end of which is fixed onto the sidewall 172b, and extends in the $W_2$ direction. The other end of the shaft 175 is engaged with an engagement groove 182 of a holder 181b of the base 180 shown in FIG. 3. The forcing member is not limited to the compression spring, and may be another member, such as cylindrical rubber, as long as it satisfies the function in the present invention.

The guide groove 176 serves to guide a movement of the lock member 170 in the W direction in cooperation with a rail 184 of the base 180. The guide groove 176 is formed on the bottom surface of the base 171. A guidance operation between the guide groove 176 and the rail 184 would prevent unstableness when the lock member 170 is moving in the W direction.

The base 180 serves to accommodate each part of the lock unit 140 in cooperation with the top plate 150, and to guide and restrict a movement of the lock member 170. The base 180 includes a pair of holders 181a and 181b, a pair of projections 183, a rail 184, a perforation hole 185, and a support member 186. The base 180 is made, for example, a blend of polycarbonate and ABS resin, and integrated with the back surface of the front cover 131 of the display unit 130.

A pair of holders 181a and 181b each has a U shape, defines an outline of the lock unit 140, and holds the top plate 150. The holder 181a contacts the sidewall 172a, and restricts its movement. The holder 181b has an engagement groove 182 that supports the shaft 175. The inside of the sidewall having the engagement groove 182 of the holder 181b contacts the end 190b of the forcing member 190. A pair of rods 183 is formed at one corner of the holders 181a and 181b. A pair of rods 183 is inserted into the pair of attachment holes 152 of the top plate 150. The rail 184 extends in the W direction, and is engaged with the guide groove 176. The hook 174 is inserted into the perforation hole 185. The support member 186 supports the operation button 162.

The forcing member 190 serves as a forcing member that forces the hook 174 towards the lock position, and as a forcing member that forces the operating member 160 to the projection position. One forcing member 190 serves two forcing functions, and contributes to the effective utilization of the housing space. The forcing member 190 includes a compression spring, and is penetrated by the shaft 175. One end 190a of the forcing member 190 contacts the sidewall 172b, and the other end 190b contacts the inside of the sidewall having the engagement groove 182 of the holder 181. As a result of that the forcing member 190 forces the lock member 170 in the $W_1$ direction, the hook 174 is forced to the lock position. A direction of the force which the forcing member 190 applies to the lock member 170 is converted by the guide member 164, and transmitted to the operation member 160. As a consequence, the operation member 160 projects in the $L_1$ direction.

Figure 9A:
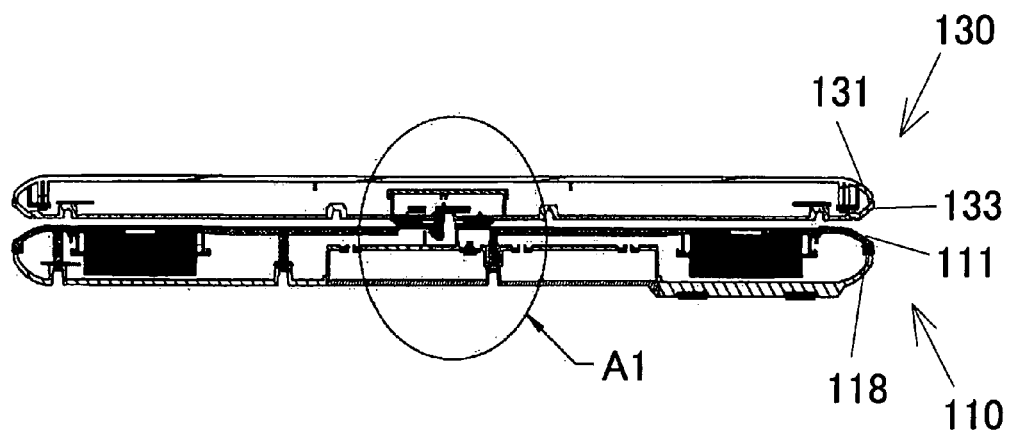
FIG. 9A is a MM sectional view of FIG. 8 in the lock state.
Figure 9B:
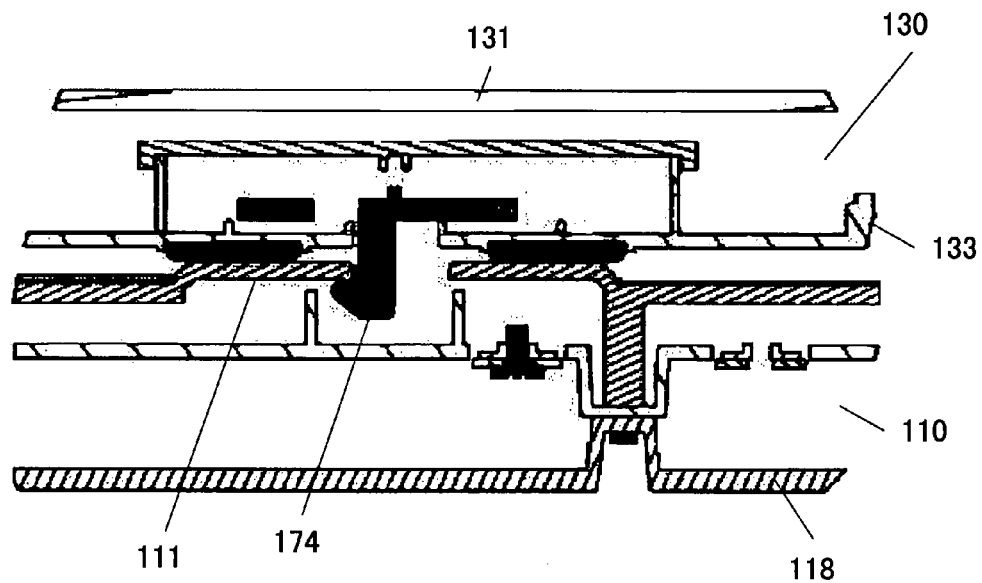
FIG. 9B is an enlarged sectional view of A1 part in FIG. 9A.
Figure 10A:
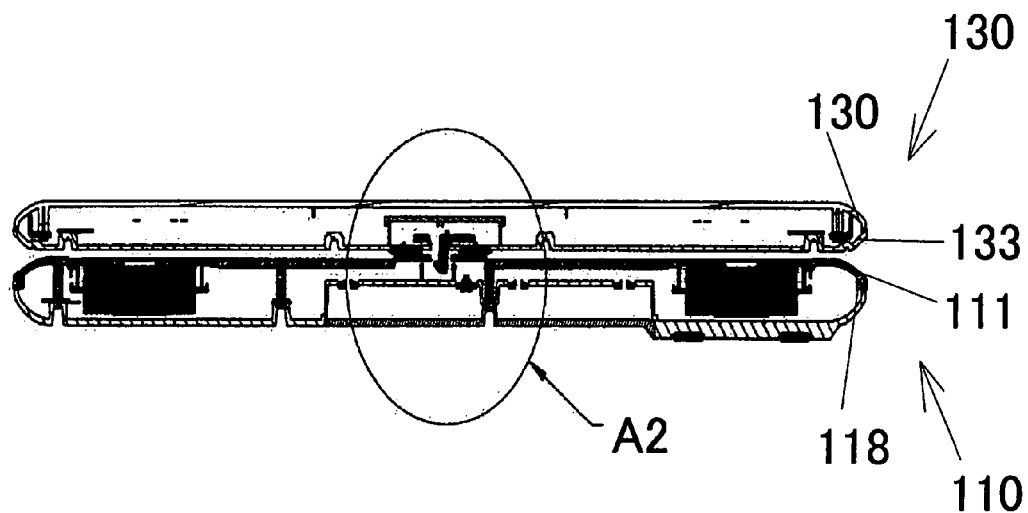
FIG. 10A is a MM sectional view of FIG. 8 in the unlock state.
Figure 10B:
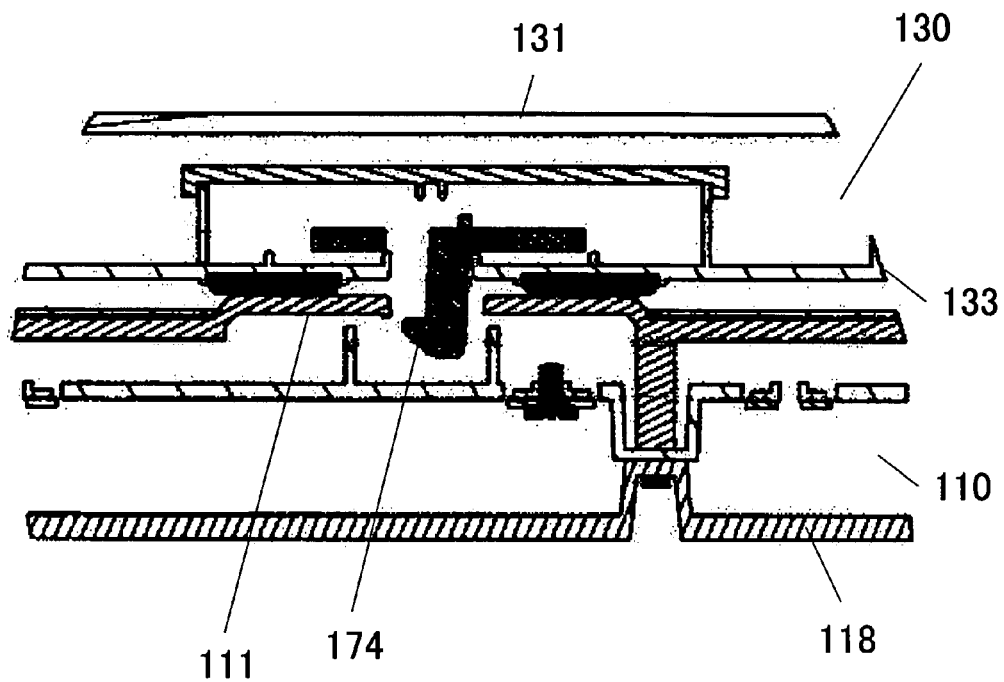
FIG. 10B is an enlarged sectional view of A2 part in FIG. 10A in the unlock state.

Referring now to FIGS. 8-10, a description will be given of opening and closing actions of the housing. Here, FIG. 8 is a top view of the laptop PC 100 in the lock state. FIG. 9A is a MM sectional view of FIG. 8 in the lock state, and FIG. 9B is an enlarged sectional view of A1 part in FIG. 9A in the lock state. FIG. 10A is the MM sectional view of FIG. 8 in the unlock state, and FIG. 10B is an enlarged sectional view of A2 part of FIG. 10A in the unlock state.

In the lock state shown in FIGS. 8, 9A, and 9B, each projection 173 is located in the back ends of the guide groove 168 in FIG. 3 due to the force by the forcing member 190. As a result, the operation button 162 projects from the housing in the $L_1$ direction, and the hook 174 is located in the perforation hole 185 at an end in the $W_1$ direction, and contacts the back surface of the upper cover 111 as shown in FIG. 9B. In the lock state, due to the engagement between the hook 174 and the upper cover 111, the display unit 130 cannot be unfolded.

Next, the user presses the operation button 162 shown in FIG. 3 in the $L_2$ direction. When the operation member 160 moves in the $L_2$ direction due to the engagement between the projection member 166 and the guide groove 153, each projection 173 moves to the front end in the guide groove 168. As a result, the lock member 170 moves in the $W_2$ direction against the force of the forcing member 190 until the hook 174 moves to the end in the perforation hole 185 in the $W_2$ direction.

In the unlock state shown in FIGS. 10A and 10B, each projection 173 is located at the front end in the guide groove 168. The operation button 162 retreats to the end in the $L_2$ direction, and the hook 174 is located at the end in the perforation hole 185 in the $W_2$ direction and spaced from the back surface of the upper cover 111 as shown in FIG. 10B. In the unlock state, the hook 174 is not engaged with the upper cover 111. Therefore, the display unit 130 can be lifted upwardly (in the $R_2$ direction).

After the display unit 130 is unfolded to some extent or a desired angle, the user releases the compression to the operation button 162. As a result, the projections 173 move from the front side to the backside in and along the guide grooves 168 of FIG. 3 due to the force by the forcing member 190. Therefore, the operation button 162 projects in the $L_1$ direction, and moves to the lock position in the $W_1$ direction. Thereafter, the user inputs necessary information using the keyboard 112 and the pointing device 114.

According to the conventional lock unit 20, in laterally sliding the operation button 22, the whole hand must laterally move and then lift the display unit 21 upwardly while maintaining the lateral force. Therefore, the user feels two actions in unfolding the housing, and a bad operability.

On the other hand, according to this embodiment in unfolding the housing, for example, the right palm contacts the front surface 135 and lifts the display unit 130 upwardly (in the $R_2$ direction) while a right thumb, for example, presses the operation button 162 of the operation member 160 in the $L_2$ direction. However, this action does not change the hand position except for pressing by the thumb. In addition, it is easy to move the entire hand upwardly while maintaining a press by the thumb. Therefore, the user feels as if one action unfolds the housing. Due to the continuous action from manipulating of the operation member 160 to unfolding of the housing, the operability improves in comparison with the conventional one.

After the information is input, the display unit 130 is folded in the $R_1$ direction in FIG. 2. In that case, the user pressing the operation button 162, and closing the display unit 130, like a reverse action to the above opening action. However, even if the user closes the display unit 130 without touching the operation button 162, the hook 174 is forced in the $W_2$ direction when contacting the surface of the upper cover 111. As a result, the hook 174 is inserted into the engagement hole 116 and then contacts the back surface of the upper cover 111 as shown in FIG. 9B. Therefore, it is optional to press the operation button 162 in folding the housing.

According to the laptop PC 100, the lock unit can be configured in a smaller space. In addition, its operability improves because the display unit 130 is pressed upwardly (in the $R_2$ direction) while the operation button 162 is pressed in the $L_2$ direction.

Figure 11:
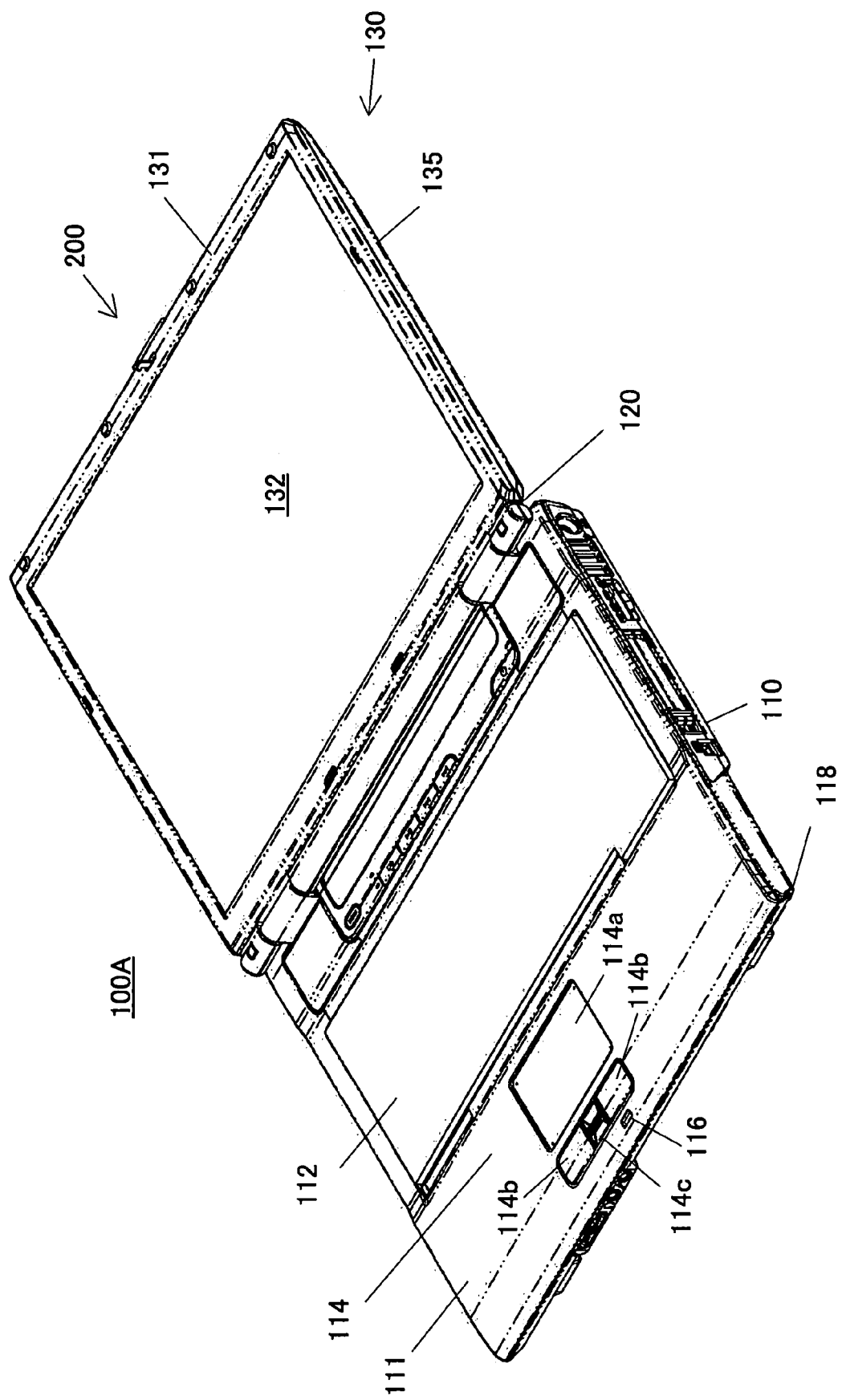
FIG. 11 is a perspective overview of the electronic apparatus (laptop PC) in an unfolded state according to a second embodiment according to the present invention.
Figure 12:
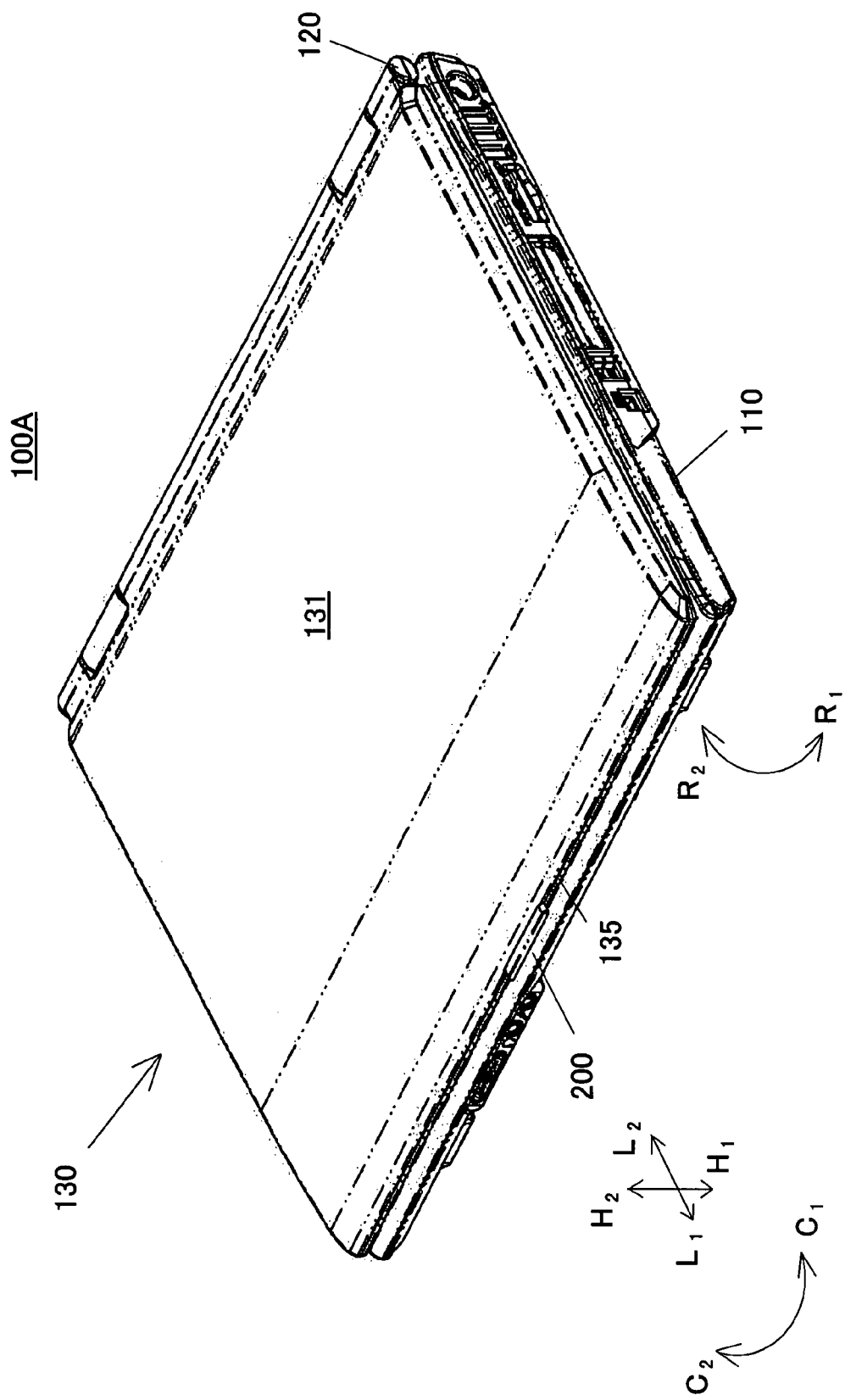
FIG. 12 is a perspective overview of the electronic apparatus shown in FIG. 11 in a folded state.
Figure 13:
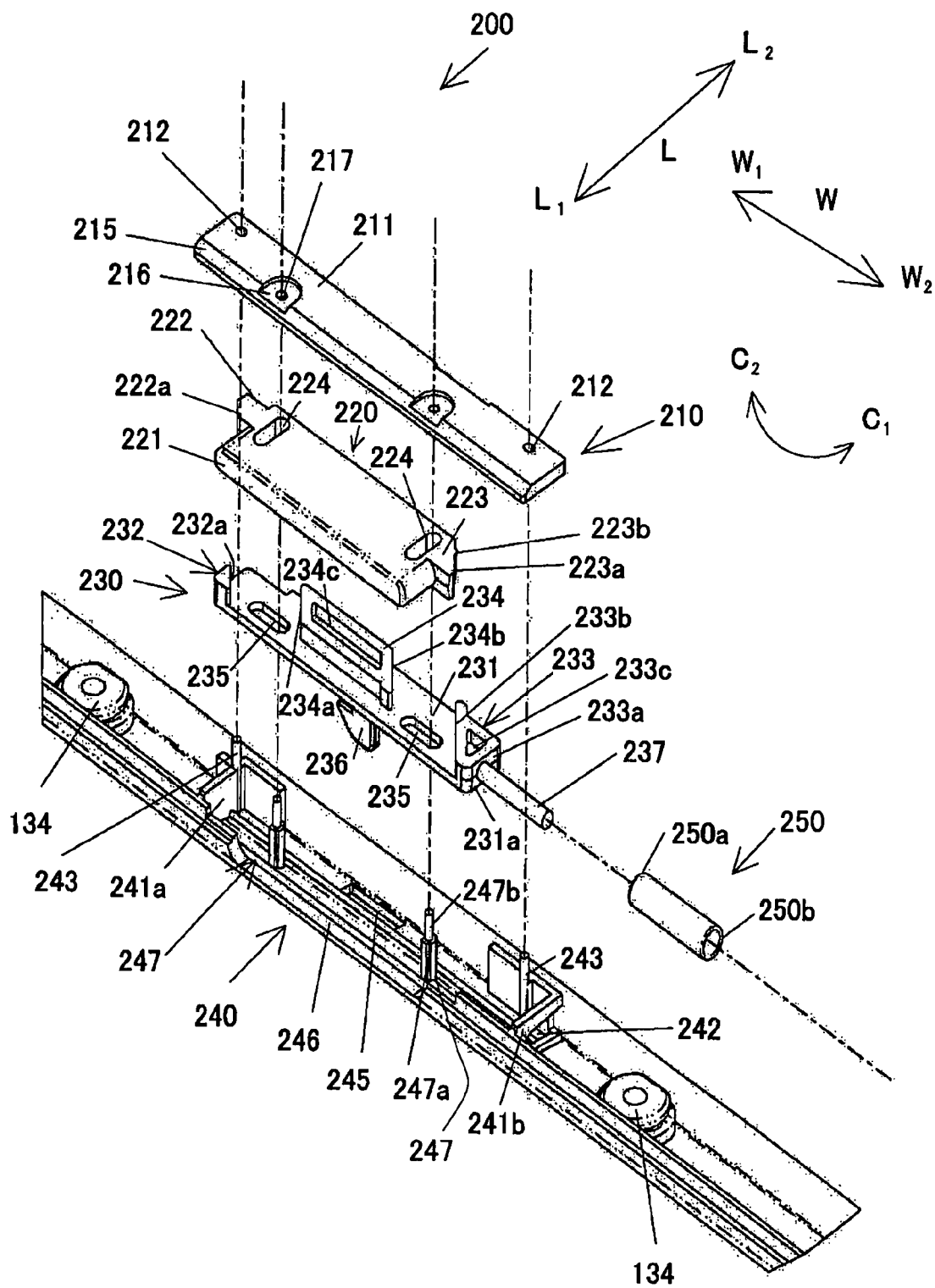
FIG. 13 is an exploded perspective view of a lock unit according to the second embodiment applicable to the electronic apparatus shown in FIG. 11.
Figure 14:
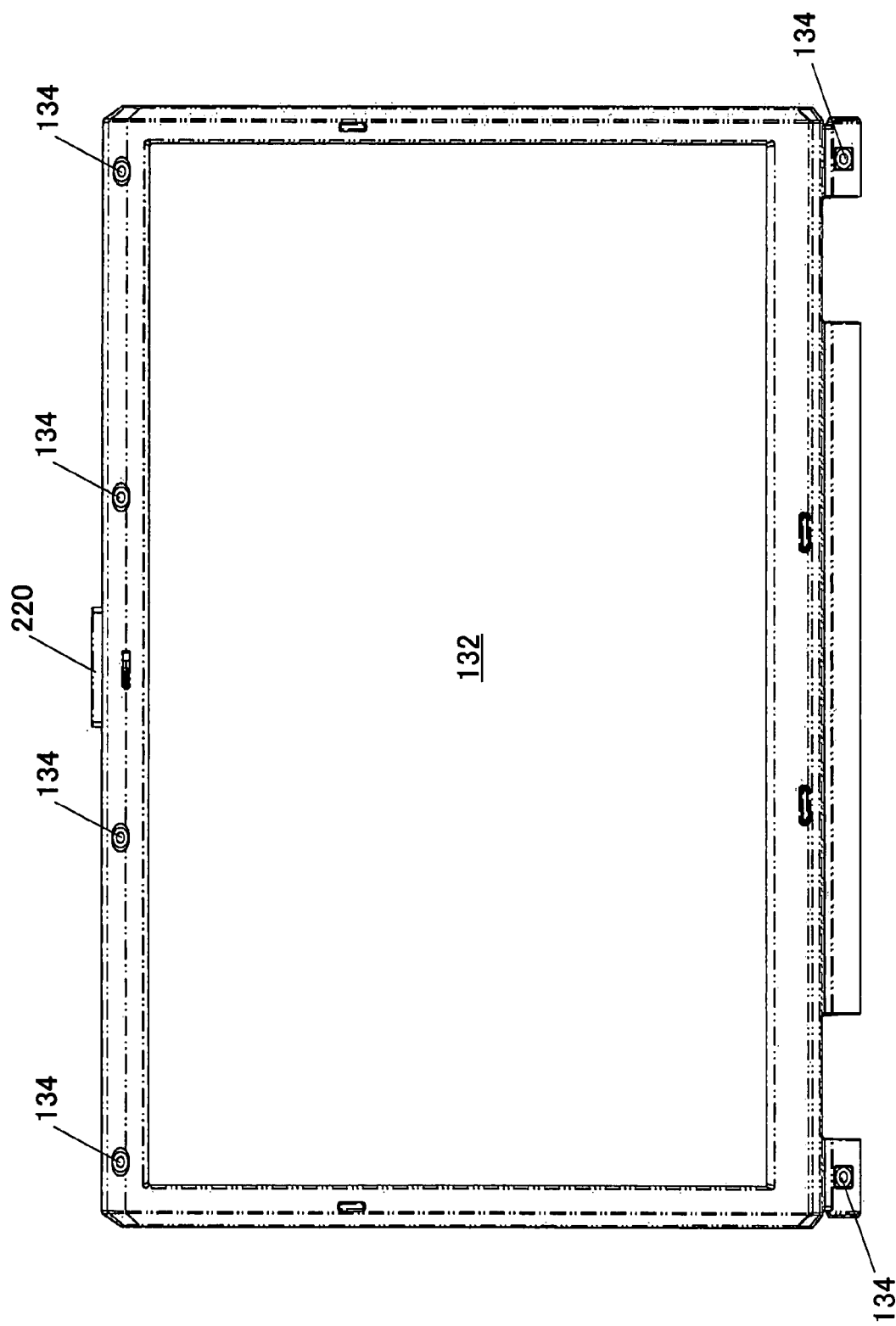
FIG. 14 is a plane view of the electronic apparatus shown in FIG. 11 in which the rear cover is detached from the display unit.
Figure 15:
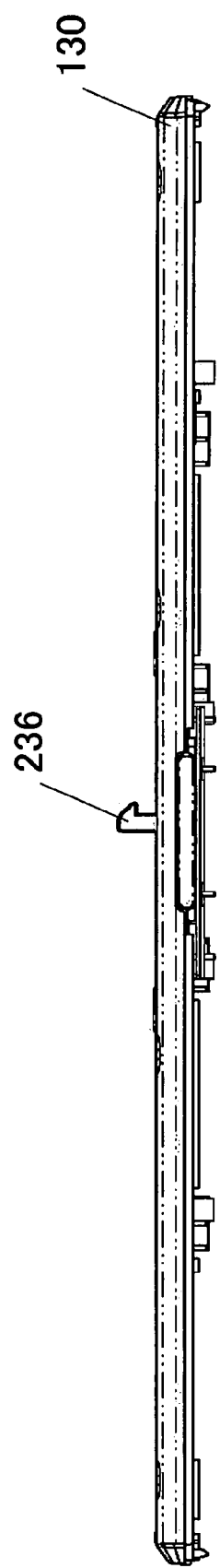
FIG. 15 is a top view of the electronic apparatus shown in FIG. 14.

Referring now to FIG. 11 to 20, a description will be given of an electronic apparatus 100A according to a second embodiment of the present invention, which is implemented as a laptop PC. Here, FIG. 11 is a perspective overview of the laptop PC 100A in the unfolded state. FIG. 12 is a perspective overview of the laptop PC 100A in the folded state. FIG. 14 is a plane view of the display unit 130 from which the rear cover is detached. FIG. 15 is a top view of the display unit 130 shown in FIG. 14.

Referring to FIG. 11, details of the laptop PC 100A are different from those of the laptop PC 100, but their basic structures are similar. Therefore, those elements in FIGS. 11-20, which are corresponding elements in FIGS. 1-10, are designated by the same reference numerals, and a description thereof will be omitted. The laptop PC 100A is different from the laptop PC 100 in that the laptop PC 100A includes a lock unit 200 instead of the lock unit 140.

The lock unit 200 locks and unlocks the display unit 130 that has been folded over the body 110. The lock unit 200 includes, as shown in FIG. 13, a top plate 210, an operation member 220, a lock member 230, a base 240, and a forcing member 250. FIG. 13 is an exploded perspective view of the lock unit 200 when viewed from the top. Illustratively, the lock unit 200 of this embodiment is arranged on the center top of the display unit 130.

The top plate 210 seals the lock unit 200, but unlike the top plate 150, the top plate 210 does not guide a movement of an operation button 221 of the operation member 220. The top plate 210 includes a base 211, two pairs of attachment holes 212 and 217, a chamfer 215, and a pair of support members 216 and is made, for example, of ABS resin.

Figure 16:
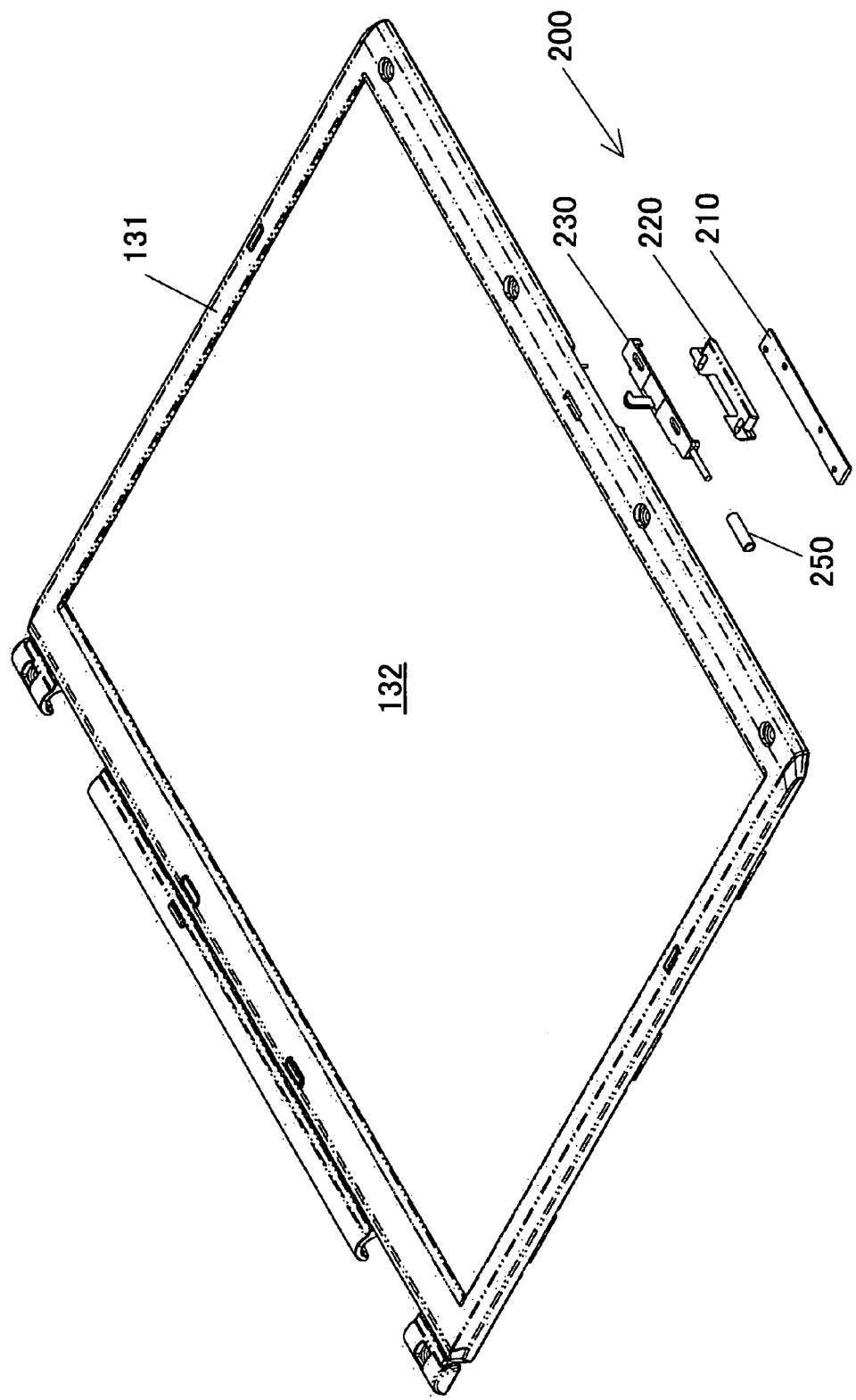
FIG. 16 is a perspective overview of the lock unit and part of the display unit in the electronic apparatus shown in FIG. 11.
Figure 17:
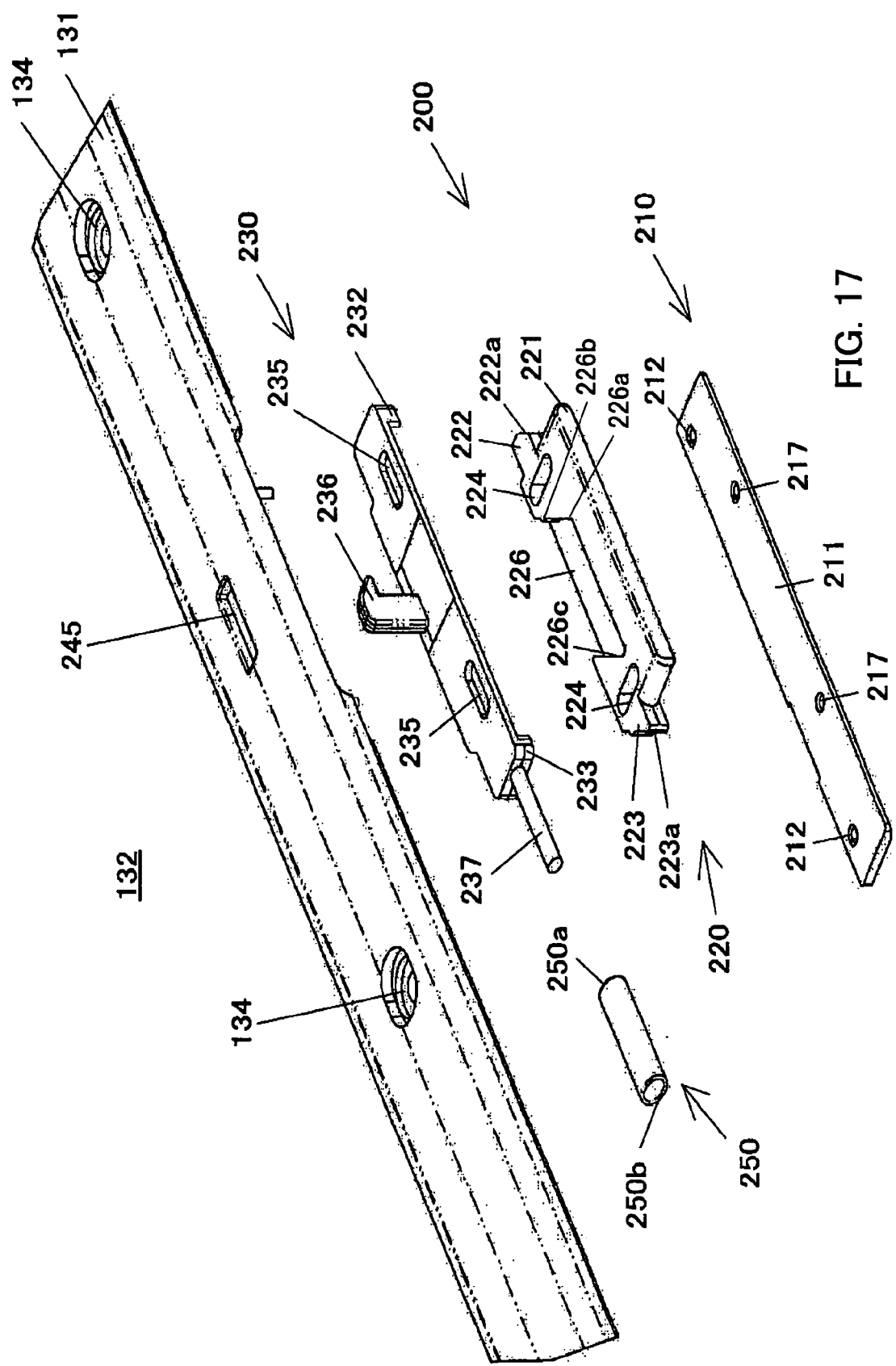
FIG. 17 is an enlarged exploded perspective view of the lock unit shown in FIG. 16.

The base 211 is a plate lid member, and seals the lock unit 200 in cooperation with the base 240. The base 211 has a pair of perforating attachment holes 212 at two back corners and a pair of perforating attachment holes 217 at its front side, but has no guide groove in its back surface as shown in FIG. 17. FIG. 17 is an enlarged exploded perspective view of the lock apparatus 200 when viewed from the bottom, enlarging part of FIG. 16. FIG. 16 is an exploded perspective view of the lock unit 200 and part of the display unit 130. A pair of rods 243 of the base 240 is inserted into the pair of attachment holes 212. In addition, a tip 247b of a pair of rod 247 of the base 240 is inserted into a pair of attachment holes 217. As a result, the top plate 210 is fixed onto the base 240. The chamfer 215 chamfers the top and front surfaces of the base 211 so that the user's finger that presses the operation button 221 does not contact the corner of the base 211, improving the operability. A pair of support members 216 is provided around a pair of attachment holes 217, and each equipped with a cap (not shown). The cap prevents exposure of a tip 247b of the rod 247 from the attachment hole 217.

The operation member 220 moves the lock part 230, and serves to unlock the folded housing that has been locked by the lock part 230. The operation member 220 can move in the L direction. The operation member 220 includes an operation button 221, a pair of projection parts 222 and 223, a pair of guide grooves 224, and a central groove 226 and is made, for example, of ABS resin.

Figure 18:
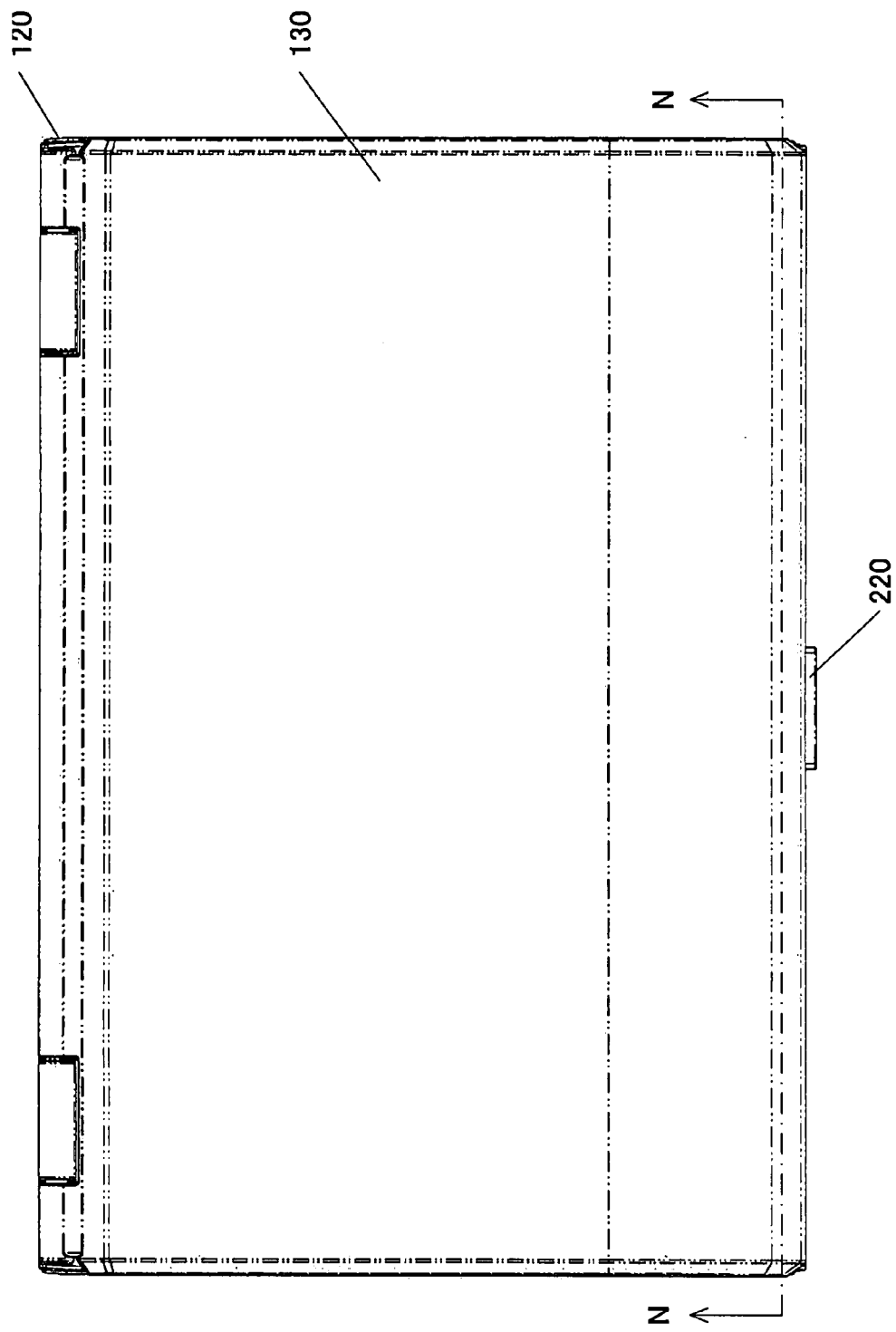
FIG. 18 is a plane view of the electronic apparatus shown in FIG. 12 in the lock state.

The operation button 221 serves as a release button onto which a compressive force is applied by a user in the unlock time. In this embodiment, the operation button 221 projects to the front from the front surface 135 of the display unit 130, as shown in FIGS. 12, 14, and 18. In addition, the operation button 221 of this embodiment is illustratively flat.

The projection part 222 projects from a left side of the operation member 220 in the $W_1$ direction. The projection part 222 has a bevel plane 222a. The bevel plane 222a is approximately parallel to the bevel plane 223a, which will be described later, and the bevel plane 222a forms 45° relative to the W direction. If necessary, the bevel plane 222a may serve as a transmission mechanism, which will be described later, together with or instead of the bevel 223a. In this embodiment, the bevel plane 222a does not serve as a transmission mechanism. The bevel plane 223a restricts a movement of the operation member 220 in the $W_1$ direction in cooperation with the bevel 232a of a cam projection 232.

The projection 223 projects from a right side of the operation member 220 in the $W_2$ direction. The projection part 223 has a bevel plane 223a, and a projection 223b provided on the bevel plane 223a, exhibiting two functions.

The first function is a function of a transmission member. The transmission mechanism is a mechanism that converts a direction of the driving force applied to the operation button 221 in the $L_2$ direction, transmits the converted driving force to the hook 236 of the lock member 230, and moves the hook 236 in the $W_2$ direction. In this embodiment, one of the transmission mechanisms includes a projection 223b provided on the bevel plane 223a of the projection part 223, and a bevel plane 233b of the cam projection 233 of the lock member 230. The projection part 223 contacts the bevel plane 233b via the projection 223b. This is because the contact between the bevel planes 223a and 233b would possibly cause an unsmooth relative movement due to frictions. However, the present invention does not prohibit a surface contact between them. In addition, the bevel plane 233b may have a projection, and the bevel plane 223 may have no projection.

The second function is a stabilization function. A contact between the projection part 223 and the bevel plane 233b would prevent a rotation of the operation button 221 in a $C_1$ direction.

A pair of guide grooves 224 extends in the L direction perpendicular to the front surface 135 of the display unit 130 shown in FIG. 12. Each base 247a of the rod 247 provided onto the base 240 is inserted into a pair of guide grooves 224. The number of guide grooves and the number of rods are not limited, and an arrangement of each of the guide groove and the rod is not also limited, as long as they correspond to the guide grooves 235, which will be described later. A guidance operation between a pair of groove guides 224 and the rods 247 prevents unstableness in the W direction when the operation member 220 is moving.

The central groove 226 is provided behind the central backside of the operation member 220, as shown in FIG. 17. When viewed from the top, the central groove 226 has an approximately parallelogram shape, and has a pair of bevel planes 226a and 226c, and a projection 226b formed on the bevel plane 226a. The bevel plane 226a opposes to a bevel plane 234a of the cam projection 234, and the bevel plane 226c opposes to a bevel plane 234b of the cam projection 234. The bevel planes 226a, 226c, 234a and 234b incline by an angle of 45° to the W direction. The central groove 226 contacts the bevel plane 234a via the projection 226b of the bevel plane 226a. A contact between the projection 226b and the bevel plane 234a would prevent a rotation of the operation button 221 in the $C_2$ direction. In this embodiment, during the movement of the operation button 221, the projection 223b moves on the bevel plane 233b, and the projection 226b moves on the bevel plane 234a. The bevel plane 226c and the 234b restrict a movement of the operation member 220 in the $W_1$ direction.

Similar to the bevel planes 223a and 233b, the present invention does not prohibit a surface contact between the bevel planes 226a and 234a. Only one of the bevel planes 226a and 234a may have a projection. The bevel planes 226c and 234b may serve as a transmission mechanism, or only one of them may have a projection, similar to the bevel planes 222a and 232a. Similar to the guide groove 168, an inclination angle of each of the bevel planes 223a, 226a, 233b, and 234a is 45°.

This embodiment converts a direction of the driving force applied to the operation button 221 in the $L_2$ direction into the $W_2$ direction, and transmits the converted driving force to the hook 236 of the lock member 230, but the present invention does not limit the driving-force direction and a conversion direction, similar to the first embodiment.

The lock part 230 serves to lock the housing in the folded state, and can move in the W direction. The lock part 230 includes a base 231, cam projections 232, 233, and 234, and a pair of guide grooves 235, a hook 236, a shaft 237 and is made, for example, of polyacetal.

The base 231 is a plate member that is movable in the W direction. Part of the shaft 237 is supported on a side surface 231a at the right side. As a result, the force by the forcing member 250 is applied to the side surface 231a, and the hook 236 is forced in the $W_1$ direction.

The cam projection 232 is an approximately right-angled triangle-pole projection provided at the front left corner, and has the bevel plane 232a. The cam projection 232 is integrated with the base 231. In this embodiment, the bevel plane 232a does not contact the bevel plane 222a, but the bevel plane 232a may contact the bevel plane 222a as discussed above.

The cam projection 233 is an approximately right-angled triangle-pole projection provided at the back right corner, and has a side surface 233a, the bevel plane 233b, and a hollow 233c. The cam projection 233 is integrated with the base 231. The side surface 233a supports part of the shaft 237 together with the side surface 231a. As a result, the force by the forcing member 250 is applied to the side surface 233a to force the hook 236 in the $W_1$ direction. The bevel plane 233b contacts the projection 223b of the bevel plane 223a as discussed above, and the projection 223b moves on the bevel plane 233b. The hollow 233c is formed to lighten the lock unit 200. In another embodiment, the side surface 231a of the base 231 and the side surface 233a of the cam projection 233 are formed as a sidewall similar to the sidewall 172b. The bevel plane 233b may be formed as a plate member separate from the side surface 233a.

The cam projection 234 is a square-pole projection with an approximately parallelogram section provided at the back center, and has a pair of bevel planes 234a and 234b, and a hollow 234c. The cam projection 234 is integrated with the base 231. The bevel plane 234a contacts the projection 226b of the bevel plane 226a, as discussed above, and the projection 226b moves on the bevel plane 234a. In this embodiment, the bevel plane 234b does not contact the bevel plane 226c, but may contact the bevel plane 226c, as discussed above. The hollow 234c is formed to lighten the lock unit 200. In another embodiment, the bevel planes 234a and 234b may be formed as a pair of plate members.

A pair of guide grooves 235 extends in the W direction parallel to the front surface 135 of the display unit 130 shown in FIG. 12. The bases 247a of the rods 247 provided onto the base 240 are inserted into a pair of guide grooves 235. The number of guide grooves and the number of rods are not limited, and an arrangement of each of the guide groove and the rod is not also limited. However, the guide groove and the rod must correspond to the above guide grooves 224. A guidance operation between a pair of guide grooves 224 and the rod 247 in the W direction would prevent unstableness in the L direction when the operation member 220 is moving.

The hook 236 is a hook member that is engaged with the back surface of the upper cover 111 and serves to lock the housing in the folded state. The hook 236 projects from the back surface of the base 231, and is movable with the base 231 in the W direction. The hook 236 is inserted into the perforation hole 245, and its movement in the W direction is restricted. The end of the perforation hole 245 in the $W_1$ direction is a lock position at which the hook 236 is engaged with the back surface of the upper cover 111, and the end of the perforation hole 245 in the $W_2$ direction is an unlock position at which the hook 236 is disengaged from the back surface of the upper cover 111.

The shaft 237 supports the compression spring 250 that serves as a forcing member, and serves to guide a movement of the lock member 230 in the W direction. The shaft 237 serves to hold the forcing member and to guide a movement of the lock member 230, effectively utilizing the housing space. The shaft 237 is a rod, one end of which is fixed onto the side surfaces 231a and 233a, and extends in the $W_2$ direction. The other end of the shaft 237 is engaged with an engagement groove 242 of a holder 241b of the base 240 shown in FIG. 13. The forcing member is not limited to the compression spring, and may be another member, such as cylindrical rubber, as long as it satisfies the function in the present invention.

The base 240 serves to accommodate each part of the lock unit 140 in cooperation with the top plate 210, and to guide and restrict a movement of the lock member 230. The base 240 includes a pair of holders 241a and 241b, two pairs of projections 243 and 247, a perforation hole 245, and a support member 246. The base 240 is made, for example, a blend of polycarbonate and ABS resin, and integrated with the back surface of the front cover 131 of the display unit 130.

A pair of holders 241a and 241b each has an L shape, defines an outline of the lock unit 200, and holds the top plate 210. The holder 241a contacts the side surface of the cam projection 232 of the base 231, and restricts its movement. The holder 241b has the engagement groove 242 that supports the shaft 237. The inside of the sidewall having the engagement groove 242 of the holder 241b contacts an end 250b of the forcing member 250. A pair of rods 243 is formed at one corner of each of the holders 241a and 241b. A pair of rods 243 is inserted into a pair of attachment holes 212 of the top plate 210. The hook 236 is inserted into the perforation hole 245. The support member 246 supports the operation button 221. Each rod 247 has the base 247a and tip 247b. The base 247a and the tip 247b have a cylindrical shape, and the tip 247b is smaller in diameter than the base 247a. The bases 247a perforate through two pairs of guide grooves 224 and 235. Each tip 247b is attached to the attachment hole 217, and covered with a cap (not shown) that is engaged with the support member 216.

The forcing member 250 serves as a forcing member that forces the hook 236 towards the lock position, and as a forcing member that forces the operating member 220 towards the projection position. One forcing member 250 serves two forcing functions, and contributes to the effective utilization of the housing space. The forcing member 250 includes a compression spring, and is penetrated by the shaft 237. One end 250a of the forcing member 250 contacts the side surfaces 231a and 233a, and the other end 250b contacts the inside of the sidewall having the engagement groove 242 of the holder 241. As a result of that the forcing member 250 forces the lock member 230 in the $W_1$ direction, the hook 236 is forced to the lock position. A direction of the force which the forcing member 250 applies to the lock member 230 is converted by the projections 223b and 226b and the bevel planes 233b and 234a, and transmitted to the operation member 220. As a consequence, the operation member 220 projects in the $L_1$ direction.

Figure 19A:
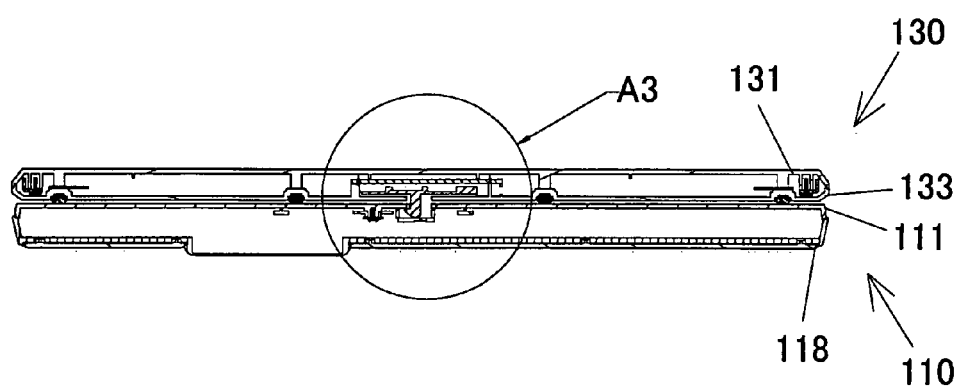
FIG. 19A is an NN sectional view of FIG. 18 in the lock state.
Figure 19B:
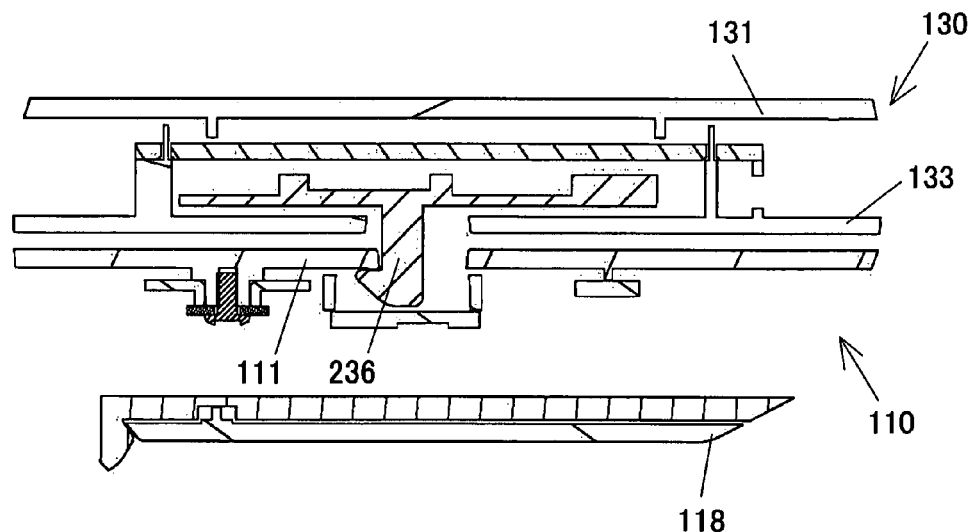
FIG. 19B is an enlarged sectional view of A3 part in FIG. 19A in the lock state.
Figure 19C:
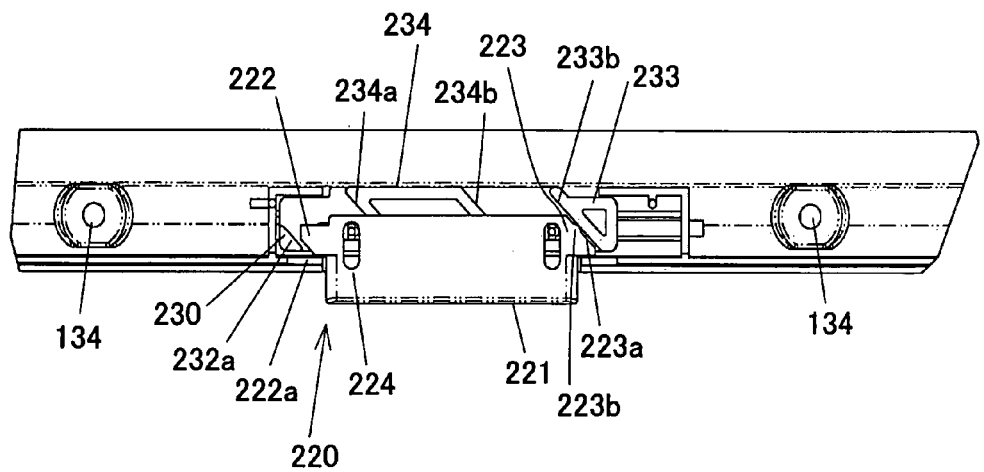
FIG. 19C is an enlarged plane view of the inside of the lock unit in the lock state.
Figure 20A:
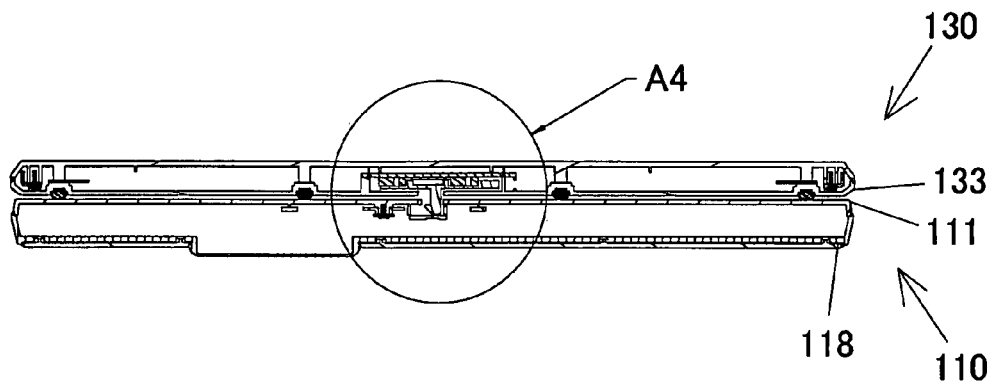
FIG. 20A is the NN sectional view of FIG. 18 in the unlock state.
Figure 20B:
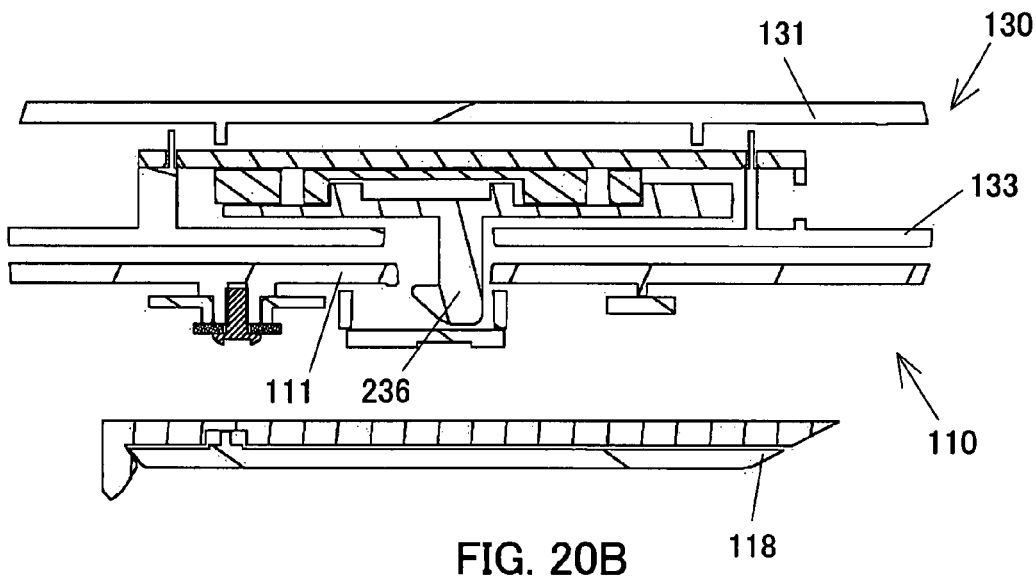
FIG. 20B is an enlarged sectional view of an A4 part in FIG. 20A in the unlock state.
Figure 20C:
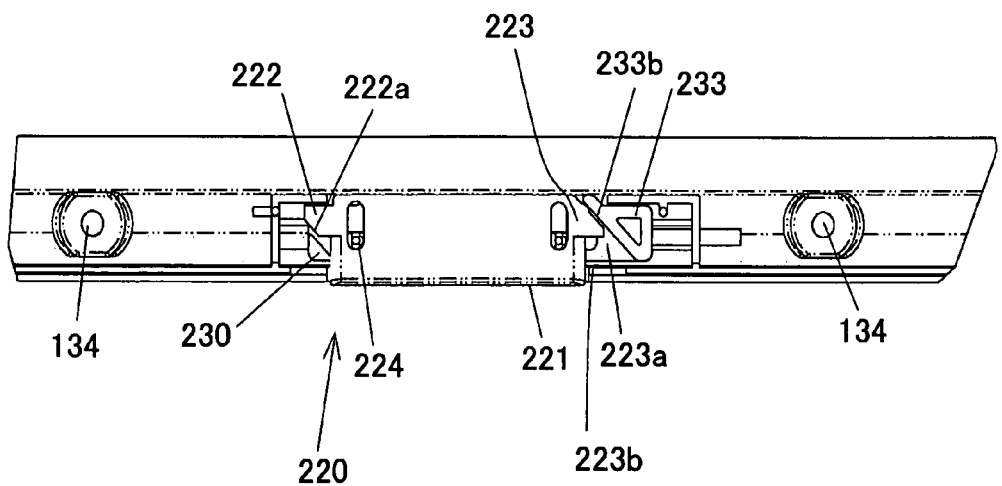
FIG. 20C is an enlarged plane view of the inside of the lock unit in the unlock state.
Figure 21:
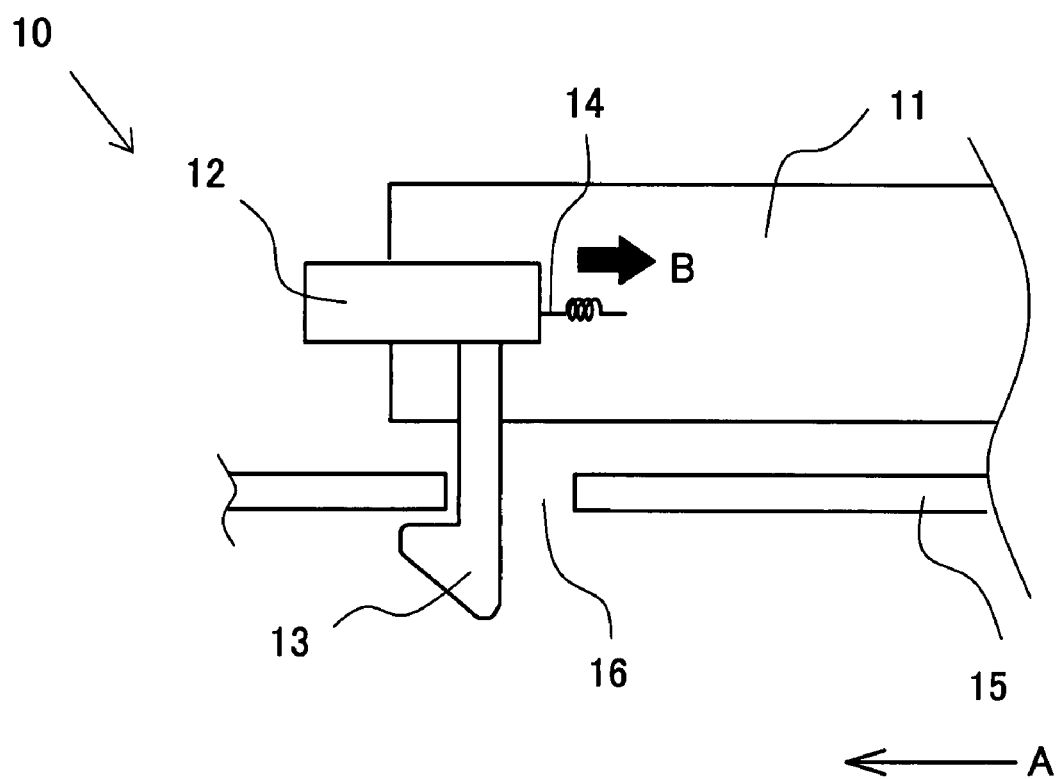
FIG. 21 is a schematic sectional view of a conventional lock unit.
Figure 22:
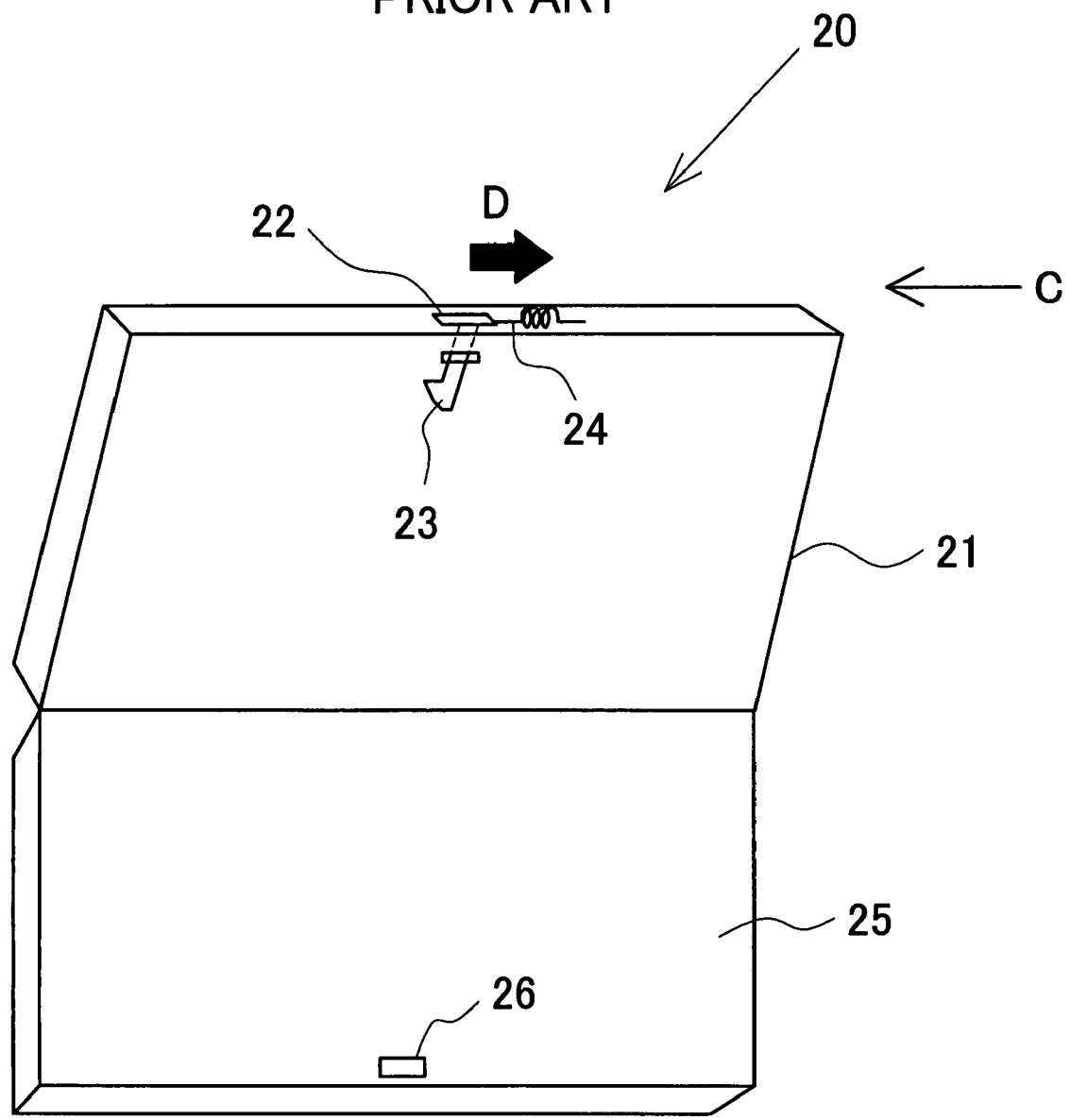
FIG. 22 is a schematic sectional view of another conventional lock unit.

Referring now to FIGS. 18-20, a description will be given of the opening and closing actions of the housing. Here, FIG. 18 is a top view of the laptop PC 100A in the lock state. FIG. 19A is an NN sectional view of FIG. 18 in the lock state, and FIG. 19B is an enlarged sectional view of A3 part in FIG. 19A in the lock state. FIG. 20A is the NN sectional view of FIG. 18 in the unlock state. FIG. 20B is an enlarged sectional view of A4 part of FIG. 20A in the unlock state. FIG. 20C is an enlarged plane view of the inside of the lock unit in the unlock state.

In the lock state shown in FIGS. 18, 19A to 19C, the base 247a of the rod 247 is located at the (back) end of the guide groove 224 on the $L_2$ side and the (right) end of the guide groove 235 on the $W_2$ side in FIG. 13 due to the force by the forcing member 250. As a result, the operation button 221 projects from the housing in the $L_1$ direction, and the hook 236 is located at the end of the perforation hole 245 on the $W_1$ direction side, and contacts the back surface of the upper cover 111 as shown in FIG. 19B. In the lock state, due to the engagement between the hook 236 and the upper cover 111, the display unit 130 cannot be lifted.

Next, the user presses the operation button 221 shown in FIG. 13 in the $L_2$ direction. When the operation member 220 moves in the $L_2$ direction due to the engagement between the base 247a and the guide groove 224, the base 231 moves in the $W_2$ direction due to the action of the transmission mechanism. As a result, the lock member 230 moves in the $W_2$ direction against the force of the forcing member 250 until the hook 236 moves to the end in the perforation hole 245 on the $W_2$ direction side.

In the unlock state shown in FIGS. 20A to 20C, each base 247a is located at the (front) end of the guide groove 224 in the $L_1$ side and at the (left) end of the guide groove 235 at the $W_1$ side in FIG. 13. The operation button 221 retreats to the end on the $L_2$ direction side, and the hook 236 is located at the end in the perforation hole 245 on the $W_2$ direction side, and spaced from the back surface of the upper cover 111 as shown in FIG. 20B. In the unlock state, the hook 236 is not engaged with the upper cover 111, and the display unit 130 can be lifted upwardly (in the $R_2$ direction).

The operation is similar to that of the first embodiment after the display unit 130 is unfolded to some extent or a desired angle. Also, it is similar to the lock unit 140 that the lock unit 200 improves the operability in comparison with the conventional lock unit 20. The folding operation after the information is input is also similar to the first embodiment.

According to the laptop PC 100A, the lock unit can be configured in a smaller space. In addition, its operability improves because the display unit 130 is pressed upwardly (in the R$_2$ direction) while the operation button 221 is pressed in the L$_2$ direction.

Further, the present invention is not limited to these preferred embodiments, and various variations and modifications may be made without departing from the scope of the present invention. For example, a similar effect can be obtained even when the hook 174 is configured to face the right and the shaft 175 and the forcing member 190 may be provided at the sidewall 172a side, and the guide groove 168 may extend in the right oblique direction in FIG. 3. In addition, while this embodiment configures the hooks 174 and 236 displaceable, the hook 174 or 236 may be fixed and an engagement member may be provided in the engagement hole 116 so as to be engageable with the hook 174 or 236, and the lock unit may be provided in the body 110 to make the engagement member displaceable.

Thus, the present invention can provide a lock unit and an electronic apparatus having the same, which can effectively utilize the housing space and the operability.

What is claimed is:

1. A lock unit used for an electronic apparatus that includes a foldable housing and an unfoldable housing, the foldable housing having a top surface and a front surface orthogonal to the top surface, said lock unit comprising:
    a lock member configured to lock the foldable housing in a folded state by engaging a lock structure on the unfolded housing;
    an operation member configured to move the lock member and to release the lock member from engagement with the lock structure;
    a transmission mechanism comprising a first transmission surface on the operation member that interacts with a second transmission surface on the lock member, the transmission mechanism is configured to transmit a driving force applied to the operation member to the lock member so that the lock member moves in a direction orthogonal to an operating direction of the operation member,
    the operation member being provided on the front surface, and the operating direction of the operation member being a first direction perpendicular to the front surface, the lock member projecting in a second direction orthogonal to the top surface, and a moving direction of the lock member being a third direction orthogonal to the first and second directions;
    a first guide member configured to guide movement of the operation member, the first guide member comprised of a plurality of first guide grooves that extends in the operating direction of the operation member;
    a second guide member configured to guide movement of the lock member, the second guide member comprised of a plurality of second guide grooves that extends in the moving direction of the lock member; and
    a plurality of restricting members, each restricting member fixed into the foldable housing and inserted into respective grooves of the first and second guide grooves.

2. A lock unit according to claim 1, wherein the transmission mechanism includes:
    a first bevel plane provided on the operation member; and
    a second bevel plane that is provided on the lock member, and can operably contact the first bevel plane.

3. A lock unit according to claim 2, wherein one of the first and second bevel planes has a projection, and the first and second bevel planes contact each other via the projection.

4. A lock unit according to claim 2, wherein each of the first and second bevel planes extends in a direction of 45° to the moving direction of the lock member.

5. A lock unit according to claim 1, further comprising:
    a first engagement member that extends in a direction approximately perpendicular to the moving direction of the lock member, and is coupled with the lock member;
    a second engagement member that extends in the direction approximately perpendicular to the moving direction of the lock member, and is fixed onto the housing;
    a rod that having one end that is fixed onto the first engagement part, and the other end that penetrates through the second engagement part, the rod extending in the moving direction of the lock member; and
    a forcing mechanism that is provided around the rod, and has one end that contacts the first engagement part, and the other end that contacts the second engagement part.

6. A lock unit according to claim 1, wherein the lock member is movable between a lock position used to lock the housing and an unlock position used to unlock the housing,
    wherein the operation member is movable between a non-operating position that allows the lock by the lock member and an operating position that releases the lock by the lock member, and
    wherein the lock unit further comprising a forcing member that forces the lock member towards the lock position, and the operation member towards the non-operating position.

7. An electronic apparatus comprising:
    a foldable housing and an unfoldable housing, the foldable housing having a top surface and a front surface orthogonal to the top surface;
    a lock unit that includes:
    a lock member configured to lock the foldable housing in a folded state;
    an operation member configured to move the lock member and to release the lock member from engagement with a lock structure at the unfolded housing;
    a transmission mechanism comprising a first transmission surface on the operation member that interacts with a second transmission surface on the lock member, the transmission mechanism is configured to transmit a driving force applied to the operation member to the lock member so that the lock member moves in a direction orthogonal to an operating direction of the operation member;
    the operation member being provided on the front surface, and the operating direction of the operation member being a first direction perpendicular to the front surface, the lock member projecting in a second direction orthogonal to the top surface, and a moving direction of the lock member being a third direction orthogonal to the first and second directions;
    a first guide member configured to guide a movement of the operation member, the first guide member comprised of a plurality of first guide grooves that extends in the operating direction of the operation member;
    a second guide member configured to guide a movement of the lock member, the second guide member comprised of a plurality of second guide grooves that extends in the moving direction of the lock member; and
    a plurality of restricting members, each restricting member fixed into the foldable housing and inserted into respective grooves of the first and second plurality of guide grooves.

* * * * *

UNITED STATES PATENT AND TRADEMARK OFFICE
CERTIFICATE OF CORRECTION

| | | |
|---|---|---|
| PATENT NO. | : 7,665,774 B2 | Page 1 of 1 |
| APPLICATION NO. | : 11/907614 | |
| DATED | : February 23, 2010 | |
| INVENTOR(S) | : Minoru Kumagai et al. | |

It is certified that error appears in the above-identified patent and that said Letters Patent is hereby corrected as shown below:

Column 16, Line 54, after "to guide" delete "a".

Column 16, Line 58, after "to guide" delete "a".

Signed and Sealed this

First Day of June, 2010

David J. Kappos
*Director of the United States Patent and Trademark Office*